US008209467B2

(12) United States Patent
Ito et al.

(10) Patent No.: US 8,209,467 B2
(45) Date of Patent: Jun. 26, 2012

(54) RECORDING APPARATUS, RECORDING METHOD, PROGRAM FOR RECORDING METHOD, AND STORAGE MEDIUM THAT STORES PROGRAM FOR RECORDING METHOD

(75) Inventors: Ryogo Ito, Tokyo (JP); Hiroshi Shimono, Tokyo (JP); Junichi Yokota, Kanagawa (JP); Fumihiko Kaise, Tokyo (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 12/339,539

(22) Filed: Dec. 19, 2008

(65) Prior Publication Data

US 2009/0198889 A1    Aug. 6, 2009

(30) Foreign Application Priority Data

Feb. 5, 2008    (JP) ................ P2008-025073

(51) Int. Cl.
    *G06F 12/00*    (2006.01)
(52) U.S. Cl. ........ 711/103; 711/154; 711/165; 711/171; 711/172
(58) Field of Classification Search .......... 711/103, 711/154, 165, 171, 172
    See application file for complete search history.

(56) References Cited

U.S. PATENT DOCUMENTS

| 6,279,069 | B1 * | 8/2001 | Robinson et al. ............ 711/103 |
| 6,795,890 | B1 * | 9/2004 | Sugai et al. ................. 711/103 |
| 7,054,790 | B1 | 5/2006 | Rich |
| 7,082,510 | B2 * | 7/2006 | Yamagami et al. .......... 711/200 |
| 7,139,864 | B2 * | 11/2006 | Bennett et al. ............... 711/103 |
| 2004/0064607 | A1 | 4/2004 | Odakura et al. |
| 2005/0172065 | A1 * | 8/2005 | Keays ........................... 711/103 |
| 2007/0033362 | A1 * | 2/2007 | Sinclair ......................... 711/165 |

FOREIGN PATENT DOCUMENTS

| EP | 1 746 491 A1 | 1/2007 |
| EP | 1 785 836 A2 | 5/2007 |
| EP | 1 785 836 A3 | 5/2007 |
| JP | 2007-122221 | 5/2007 |
| WO | WO 2006/006694 A1 | 1/2006 |
| WO | 2007/034706 A1 | 3/2007 |

* cited by examiner

*Primary Examiner* — Matthew Bradley

(74) *Attorney, Agent, or Firm* — Oblon, Spivak, McClelland, Maier & Neustadt, L.L.P.

(57) ABSTRACT

A recording apparatus includes: a type detecting section that detects a type of storage medium; an erase-block size detecting section that detects an erase-block size of the storage medium; a recording section that records desired data to a data area in the storage medium and records management information of the data area to a management area in the storage medium; and a control section that controls the recording section by issuing a command to the recording section, on the basis of results of the detection. Each time a certain amount of data is recorded to the data area, the control section updates the management information in accordance with the recording, and when the storage medium is a storage medium in which recorded data is updated for each erase-block size, the control section increases the certain amount of data according to an increase in the erase-block size.

7 Claims, 17 Drawing Sheets

FIG. 6

| ERASE-BLOCK SIZE | BATCH WRITING SIZE (B) |
|---|---|
| 256 KB | 256 KB × M |
| 512 KB | 512 KB × M |
| 1 MB | 1 MB × M |
| 2 MB | 2 MB × M |
| 4 MB | 4 MB × M |
| 8 MB | 8 MB × M |
| 16 MB | 16 MB × M |
| 32 MB | 32 MB × M |

FIG. 7

| MEDIUM TYPE | WEDGING COUNT (A) |
|---|---|
| MEMORY CARD (GENERAL PURPOSE) | 8 |
| MEMORY CARD (STANDARD GRADE FOR HIGH-END USER) | 4 |
| MEMORY CARD (HIGH GRADE FOR HIGH-END USER) | 2 |
| HDD | 1 |

FIG. 8

| MEDIUM TRANSFER RATE | BATCH WRITING SIZE (C) | WEDGING COUNT (D) |
|---|---|---|
| 70 Mbps - | 256 KB × M | 1 |
| 60 - 70 Mbps | 512 KB × M | 1 |
| 50 - 60 Mbps | 1 MB × M | 2 |
| 40 - 50 Mbps | 2 MB × M | 2 |
| 30 - 40 Mbps | 4 MB × M | 4 |
| 20 - 30 Mbps | 8 MB × M | 4 |
| 10 - 20 Mbps | 16 MB × M | 8 |

FIG. 19

| | +00 | +01 | +02 | +03 | +04 | +05 | +06 | +07 |
|---|---|---|---|---|---|---|---|---|
| 00000000 | RSV | RSV | - | EOF | - | - | - | 00000008 |
| 00000010 | - | 00000012 | 00000013 | 00000014 | 00000003 | 00000031 | - | - |
| 00000020 | - | - | - | - | - | - | - | - |
| 00000030 | EOF | 00000030 | - | - | - | - | - | - |

| | +08 | +09 | +0A | +0B | +0C | +0D | +0E | +0F |
|---|---|---|---|---|---|---|---|---|
| | 00000009 | EOF | 0000001F | 00000011 | - | - | - | - |
| | - | - | - | - | 0000002D | 0000002E | 0000002F | 00000025 |
| | 00000039 | 0000003A | 0000003B | EOF | - | - | - | 00000038 |

FAT ENTRY

RECORDING APPARATUS, RECORDING METHOD, PROGRAM FOR RECORDING METHOD, AND STORAGE MEDIUM THAT STORES PROGRAM FOR RECORDING METHOD

CROSS REFERENCES TO RELATED APPLICATIONS

The present invention contains subject matter related to Japanese Patent Application JP 2008-025073 filed in the Japanese Patent Office on Feb. 5, 2008, the entire contents of which are incorporated herein by reference.

BACKGROUND OF THE INVENTION

1. Field of the Invention

The present invention relates to a recording apparatus, a recording method, a program for a recording method, and a storage medium that stores a program for a recording method. The present invention is applicable to, for example, digital video cameras. In the present invention, the management information is updated each time a certain amount of data is recorded, and when a storage medium is a flash memory or the like, the certain amount of data is increased according to an increase in an erase-block size. Thus, when records in FAT entries or the like are updated each time the certain amount of data is recorded, a significant reduction in the serviceable life of the storage medium is suppressed.

2. Description of the Related Art

Typically, for recording apparatuses such as digital video cameras, desired data is recorded in various storage media by using FAT (file allocation table) file systems, such as a FAT16 system and FAT32 system. In the FAT file system, a storage area of a storage medium is divided into a data area and a management area, and the data area is managed using management information recorded in the management area for each cluster, which is a management unit of a certain amount of data.

FIG. 15 shows a hierarchical model of a typical system configuration of a FAT file system. The hierarchical model can be broadly divided into a software layer and a hardware layer therebelow. The software layer has layers for processing performed by software, such as programs and various types of firmware and middleware. In the software layer, an application layer (application) 2, a file system layer (file system) 3, and a device driver layer (file system) 4 are sequentially provided from the upper layer. The hardware layer is a layer for a physical configuration including a storage medium 5 and peripheral circuits.

The application layer 2 requests the file system layer 3 to perform recording/reproduction for each certain amount of data. The application layer 2 also obtains, from the file system layer 3, a reply to the request. The file system layer 3 converts an access request, issued from the application layer 2, into an access request for each cluster and outputs the access request to the device driver layer 4. On the basis of a reply for each cluster from the device driver layer 4, the file system layer 3 sends a reply to the request issued from the application layer 2.

The device driver layer 4 converts the each-cluster access request from the file system layer 3 into an access request for each sector, which is a physical management unit in the storage medium, and outputs the access request to the hardware layer. On the basis of a reply to the access request, the device driver layer 4 also sends a reply to the file system 3. In the FAT file system, one cluster is constituted by multiple sectors.

In response to the each-sector access request from the device driver layer 4, the hardware layer reads data from a corresponding sector in the storage medium 5 and outputs the read data to the device driver layer 4. Similarly, the hardware layer writes data to a corresponding sector in the storage medium 5 and sends a reply to the device driver layer 4. The file system layer 3 in this hierarchical model uses a FAT file system, and thus, the storage medium 5 is formatted according to the FAT file system.

FIG. 16 shows the format structure of the storage medium 5 using the FAT file system. Part (A) in FIG. 16 shows FAT16 and part (B) in FIG. 16 shows FAT32. The format structure shown in FIG. 16 also has a logical structure in accordance with LBA (logical block addressing). In FIG. 16, the top stage indicates a first sector (LBA=0) and the sector number increases sequentially toward the bottom stage. In the case shown in FIG. 16, the storage medium has one partition.

In the FAT16, an MBR (master boot record) is provided in the first sector. One sector has 512 bytes. Part (A) in FIG. 17 shows details of data allocated to the MBR in a raster scan order. In part (A) in FIG. 17, a single row has 16 bytes, and representations 0000 to 01F0 shown at the left side in part (A) in FIG. 17 each express an address of first one byte in each row in a hexadecimal representation. Representations 00 to 0F shown at the top each express an address in the row (16 bytes) in a hexadecimal representation.

In part (A) in FIG. 17, startup code is allocated to a 446-byte area of 0000h to 01BDh. The startup code is code for starting up (booting) an OS (operating system) and is provided when a storage medium is used for starting up the OS.

In the MBR, the subsequent 64-byte area from 01BEh to 01FDh has a partition table. In the partition table, the 64-byte area is divided into areas each having 16 bytes and can register four partitions. During startup of each partition, information therefor is recorded. More specifically, as shown in a partition-entry structure in part (B) in FIG. 17, a flag indicating the presence/absence of designation of a startup drive, a partition start sector expressed in a CHS (cylinder/head/sector) representation, a system identifier (type), a partition end sector expressed in a CHS representation, a partition start sector expressed by LBA, and a partition size are sequentially allocated in the partition table. The system identifier indicates a platform, a file system, and so on for the partition. In part (A) in FIG. 17, code (55AA) indicating the last 2 byte of the MBR is set in the MBR.

In the FAT16 (shown in FIG. 16), the MBR is followed by a blank area having a predetermined number of sectors. In the FAT16, an area other than the MBR and the blank area is divided into partitions. In the FAT16, a predetermined first area in each partition is allocated to a system area, which is a management area for a data area provided in the partition and the rest of the area is allocated to the data area of the partition.

In the system area, a first area having a predetermined number of bytes is allocated to a BPB (BIOS Parameter Block/Boot Parameter Block). The BPB records information used, for example, when a BIOS (Basic Input/Output System) or the like of a host accesses a FAT area that follows the BPB. More specifically, the BPB records the number of FAT areas, the start sector of a main FAT area, the number of sectors in the FAT areas, and so on.

In the system area, the BPB is followed by a first FAT area FAT 1 and a second FAT area FAT 2. One of the first FAT area FAT 1 and the second FAT area FAT 2 is set as the main FAT area and the other one is used as a backup reserved area or the like. In the FAT areas FAT 1 and FAT 2, FAT entries of clusters allocated to the data area are set in order of cluster numbers. One of code indicating "unused", code indicating an EOF (end of file), and the cluster number of a cluster in which data to be reproduced next is recorded is recorded in each FAT entry. The cluster number of a cluster in which data to be reproduced next is recorded will hereinafter be referred to as a "linked cluster number". The cluster number is a number for identifying an individual cluster allocated to the data area. In the FAT16, the cluster number is expressed in 2 bytes and each FAT entry is expressed in 2 bytes correspondingly.

In the system area, the second FAT area FAT 2 is followed by a root directory entry. The root directory entry has a directory provided in a root directory and directory entries of files. FIG. 18 shows a directory entry. In the directory entry, the name of a corresponding file, an extension, attributes, reserved, creation time, creation date, last access date, high-order 1 byte of the first-cluster number, recording time, recording date, low-order 1 byte of the first-cluster number, and a file size are sequentially allocated. In FIG. 18, upper numerals 0 to 1F indicate the byte position of each piece of data expressed in a hexadecimal representation starting from a value "0", and lower numerals 1 to 32 indicate the byte position of each piece of data expressed in a decimal representation starting from a value "1".

As a result, in the FAT16, on the basis of a file name and a extension, a directory entry of a desired file is detected from the directory entries recorded in the root directory entry. On the basis of a first cluster number set in the detected directory entry, a cluster number that identifies a first cluster in which the desired file is recorded is detected. On the basis of linked cluster numbers detected by sequentially searching the records in the FAT entries from the detected first cluster number, the cluster numbers of clusters in which subsequent data is recorded are sequentially detected.

Part (B) in FIG. 16 shows, in comparison with part (A) in FIG. 16, the format structure of the FAT32. The FAT32 has the same structure as the FAT16, except that each cluster is managed in 4 bytes, the directory entries described above in the FAT16 are provided in the data area, the structure related to the directory entries is different, and an FSInfo area is provided in the system area. Thus, in the FAT32, clusters in the data area in which a desired file is recorded are detected on the basis of a first cluster number detected from the directory entries and linked cluster numbers detected by sequentially searching records in the FAT entries from the first cluster number. The FSInfo area stores information used for calculating a blank space in the corresponding partition.

FIG. 19 shows a specific structure of the FAT entries in the FAT32. In FIG. 19, RSV indicates a reserved area and "-" indicates a blank area. In the example shown in FIG. 19, the directory entries of four files are recorded in the data area, and the first-cluster numbers of the directory entries are set to 00000007, 0000000A, 0000001B, and 0000002C. In FIG. 19, linked cluster number 00000008 is recorded in the FAT entry with cluster number 00000007, linked cluster number 00000009 is recorded in the FAT entry with cluster number 00000008, and an EOF is recorded in the FAT entry with cluster number 00000009. Thus, it can be understand that data of the file with first-cluster number 00000007 is sequentially recorded in the clusters with cluster numbers 00000007, 00000008, and 00000009.

In FIG. 19, linked cluster number 0000001F is recorded in the FAT entry with cluster number 0000000A, linked cluster number 00000025 is recorded in the FAT entry with cluster number 0000001F, linked cluster number 00000031 is recorded in the FAT entry with cluster number 00000025, linked cluster number 00000030 is recorded in the FAT entry with cluster number 00000031, and an EOF is recorded in the FAT entry with 00000030. Thus, it can be understand that data of the file with first cluster number 0000000A is sequentially recorded in the clusters with cluster numbers 0000000A, 0000001F, 00000025, 00000031, and 00000030.

Similarly, it can be understood that data of the file with first-cluster number 0000001B is sequentially recorded in the clusters with cluster numbers 0000001B, 00000011, 00000012, 00000013, 00000014, and 00000003 and data of the file with first-cluster number 0000002C is sequentially recorded in the clusters with cluster numbers 0000002C, 0000002D, 0000002E, 0000002F, 00000038, 00000039, 0000003A, and 0000003B.

During data recording, a recording apparatus of the related art searches the FAT area to detect clusters in a blank area. The recording apparatus of the related art sets a first-cluster number and so on on the basis of a result of the detection, records a directory entry, then sequentially records data to the clusters in the blank area, and sequentially records and holds, in an internal memory, the cluster numbers of the clusters to which data is recorded. When the recording of a file is completed, the recording apparatus updates the records in the FAT entries so as to correspond to the recording of the data in accordance with the records in the internal memory, sets linked clusters, and re-records a directory entry.

In connection with processing during the data recording, for example, Japanese Unexamined Patent Application Publication No. 2007-122221 discloses a method for updating records in FAT entries and setting linked clusters each time a certain amount of data is recorded in a data area. According to the method, even when power is shut down during recording of a file, data that has already been recorded can be reproduced. Thus, the method can prevent loss of precious data.

In recent years, memory cards that use flash memories as detachable storage media have been available. In the flash memories, a recording area is divided by erase blocks and data is erased for each erase block. Also, even when part of data in erase blocks is to be updated, the entire data in the erase blocks are updated. More specifically, after data to be updated is recorded to another erase block, the data updating for each erase block is executed by replacing the address of an erase block in which the data has already been recorded with the address of the other erase block.

The flash memory is generally limited in the number of recording operations. Thus, merely updating of records in the FAT entries each time a certain amount of data is recorded in order to prevent loss of precious data has a problem in that the serviceable life of the flash memory is reduced significantly.

SUMMARY OF THE INVENTION

In view of the foregoing situations, the present invention provides a recording apparatus, a recording method, a program for a recording method, and a storage medium that stores a program for a recording method which are capable of suppressing a significant reduction in the serviceable life of a storage medium when records in FAT entries are updated each time a certain amount of data is recorded.

According to an embodiment of the present invention, there is provided a recording apparatus. The recording apparatus includes: a type detecting section configured to detect a type of detachably held storage medium; an erase-block size detecting section configured to detect an erase-block size of the storage medium; a recording section configured to record desired data to a data area in the storage medium and to record management information of the data area to a management area in the storage medium; and a control section configured to control the recording section by issuing a command to the recording section, on the basis of a result of the detection performed by the type detecting section and a result of the detection performed by the erase-block size detecting section. Each time a certain amount of data is recorded to the data area, the control section updates the management information in accordance with the recording to the data area, and when the storage medium is a storage medium in which recorded data is updated for each erase-block size, the control section increases the certain amount of data according to an increase in the erase-block size.

According to another embodiment of the present invention, there is provided a recording method. The recording method includes the steps of: detecting a type of detachably held storage medium; detecting an erase-block size of the storage medium; recording desired data to a data area in the storage medium and recording management information of the data area to a management area in the storage medium; and controlling the recording step by issuing a command on the basis of a result of the detection performed in the type detecting step and a result of the detection performed in the erase-block size detecting step. In the controlling step, each time a certain amount of data is recorded to the data area, the management information is updated in accordance with the recording to the data area, and when the storage medium is a storage medium in which recorded data is updated for each erase-block size, the certain amount of data is increased according to an increase in the erase-block size.

According to still another embodiment of the present invention, there is provided a program for a recording method for recording desired data to a detachably held storage medium. The program includes the steps of: detecting a type of the storage medium; detecting an erase-block size of the storage medium; recording desired data to a data area in the storage medium and recording management information of the data area to a management area in the storage medium; and controlling the recording step by issuing a command on the basis of a result of the detection performed in the type detecting step and a result of the detection performed in the erase-block size detecting step. In the controlling step, each time a certain amount of data is recorded to the data area, the management information is updated in accordance with the recording to the data area, and when the storage medium is a storage medium in which recorded data is updated for each erase-block size, the certain amount of data is increased according to an increase in the erase-block size.

According to yet embodiment of the present invention, there is provided a storage medium that stores a program for a recording method for recording desired data to a detachably held storage medium. The program includes the steps of: detecting a type of the storage medium; detecting an erase-block size of the storage medium; recording desired data to a data area in the storage medium and recording management information of the data area to a management area in the storage medium; and controlling the recording step by issuing a command on the basis of a result of the detection performed in the type detecting step and a result of the detection performed in the erase-block size detecting step. In the controlling step, each time a certain amount of data is recorded to the data area, the management information is updated in accordance with the recording to the data area, and when the storage medium is a storage medium in which recorded data is updated for each erase-block size, the certain amount of data is increased according to an increase in the erase-block size.

According to the embodiments of the present invention, the management information is updated each time a certain amount of data is recorded to the data area, and when the storage medium is a storage medium in which recorded data is updated for each erase-block size, the certain amount of data is increased as the erase-block size increases. Thus, for a storage medium such as a flash memory, even when the erase-block size increases, the number of updating operations of the management information for the same erase block can be maintained at substantially the same level of a case in which the erase-block size is small. Thus, when records in FAT entries are updated each time a certain amount of data is recorded, it is possible to suppress a significant reduction in the serviceable life of the storage medium.

According to the present invention, when records in FAT entries are updated each time a certain amount of data is recorded, it is possible to suppress a significant reduction in the serviceable life of the storage medium.

BRIEF DESCRIPTION OF THE DRAWINGS

FIG. 6 shows a batch-writing-unit table;

FIG. 7 shows a wedging count table;

FIG. 8 shows a rate table;

FIG. 19 shows a FAT area in the format shown in FIG. 16.

DESCRIPTION OF THE PREFERRED EMBODIMENTS

Embodiments of the present invention will be described below in detail with reference to the accompanying drawings.

First Embodiment

(1) Configuration of Embodiment

Figure 2:
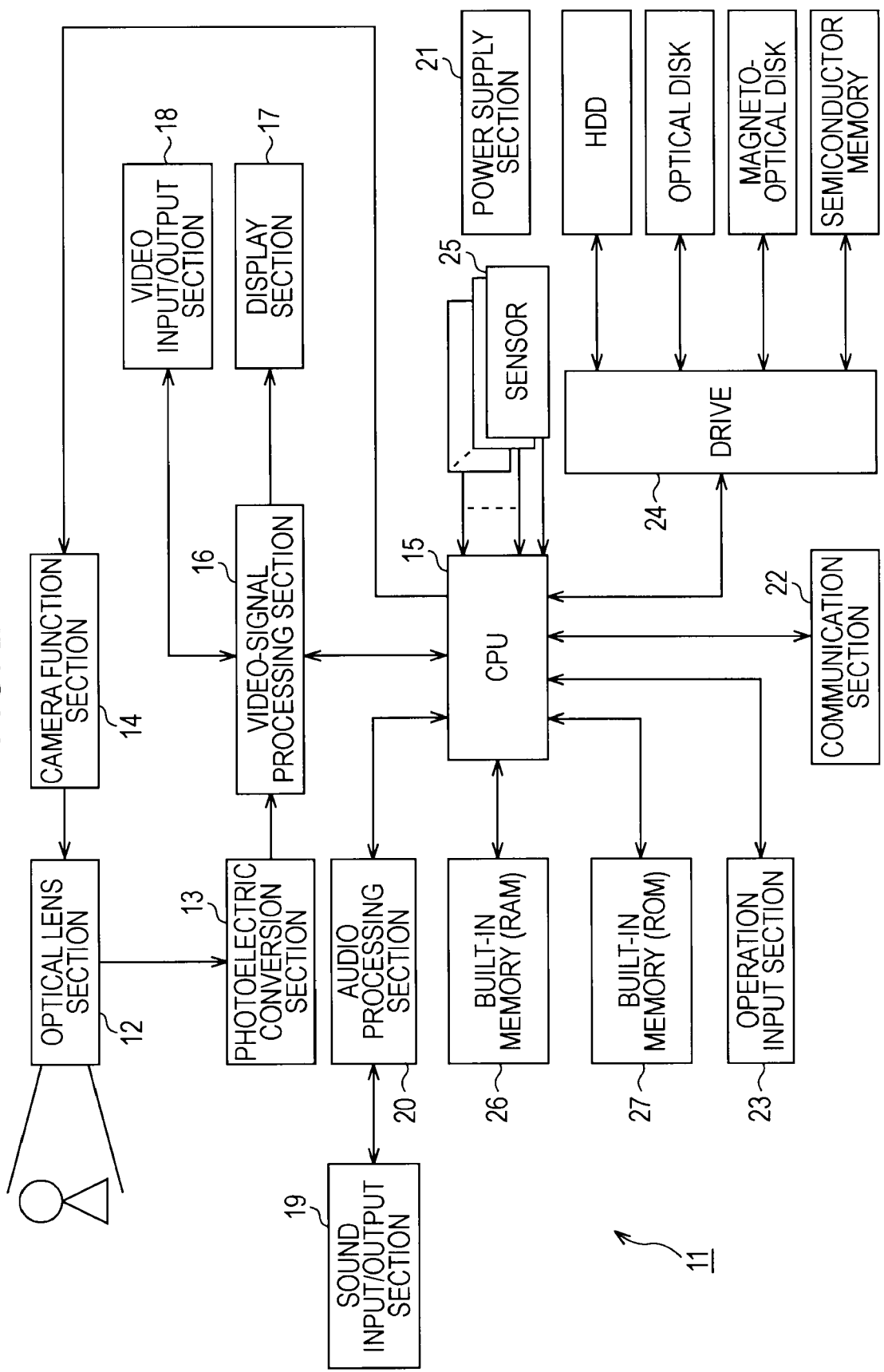
FIG. 2 is a block diagram showing the digital video camera according to the first embodiment of the present invention.

FIG. 2 is a block diagram showing a digital video camera that serves as a recording apparatus according to a first embodiment of the present invention. In this digital video camera 11, an optical lens section 12 forms a subject's optical image on an image-capture surface of a photoelectric conversion section 13. Under the control of a central processing unit (CPU) 15, a camera function section 14 controls changes in a focal distance and a diaphragm of the optical lens section 12. The photoelectric conversion section 13 has, for example, a CMOS (complementary metal oxide semiconductor) solid-state image capture device, a CCD (charge coupled device) solid-state image capture device, or the like, and outputs a photoelectric conversion result of the optical image.

A video-signal processing section 16 processes a signal output from the photoelectric conversion section 13 to generate video data and outputs the video data to a display section 17 and the CPU 15. The video-signal processing section 16 processes the video data to generate data used for autofocus adjustment and outputs the generated data to the CPU 15. The video-signal processing section 16 also performs digital-to-analog conversion processing on the video data to generate an analog video signal and outputs the analog video signal to a video input/output section 18. Conversely, the video-signal processing section 16 generates video data from an analog video signal input from the video input/output section 18 and outputs the video data to the CPU 15. The video-signal processing section 16 compresses the video data in accordance with, for example, an MPEG (moving picture experts group) system and outputs the compressed video data to the CPU 15. Under the control of the CPU 15, the video-signal processing section 16 switches its operation to decompress video data output from the CPU 15 and outputs the decompressed video data to the display section 17. The video-signal processing section 16 also converts the decompressed video data into an analog video signal and outputs the resulting video signal to the video input/output section 18.

The video input/output section 18 outputs the analog video signal, output from the video-signal processing section 16, to external equipment and also outputs an analog video signal, input from the external equipment, to the video-signal processing section 16. The display section 17 is, for example, a liquid-crystal display device, and receives the video data output from the video-signal processing section 16 and displays the video data.

A sound input/output section 19 includes a microphone for obtaining voice of the subject, a speaker for reproducing sound for listening, and so on and inputs/outputs an audio signal from/to an audio processing section 20. The audio processing section 20 amplifies the audio signal input from the sound input/output section 19 and outputs the amplified audio signal to the sound input/output section 19 for listening. The audio processing section 20 performs analog-to-digital conversion processing on the audio signal to generate audio data and outputs the generated audio data to the CPU 15. The audio processing section 20 generates an audio signal from audio data output from the CPU 15 and outputs the generated audio signal to the sound input/output section 19 for listening.

A power supply section 21 supplies power to individual units in the digital video camera 11. A communication section 22 inputs/outputs video data and audio data from/to external equipment. The communication section 22 can be implemented by, for example, an Interface using Ethernet, USB (universal serial bus), IEEE (The Institute of Electrical and Electronics Engineers, Inc) 802.11a/b/g, Bluetooth, or the like. An operation input section 23 includes various operation elements, which may be provided on an operation panel or the like of the digital video camera 11, and issues a notification indicating a user operation to the CPU 15.

Under the control of the CPU 15, a drive 24 records data, output from the CPU 15, to a storage medium or storage media loaded into the digital video camera 11, and conversely, reproduces data recorded in the storage medium and outputs the reproduced data to the CPU 15. In the present embodiment, a hard disk device (HDD), an optical disk, a magneto-optical disk, and a memory card using a semiconductor memory may be used as the storage media. Sensors 25 each detect the loading of the corresponding storage medium and issue a notification to the CPU 15.

A random access memory (RAM) 26, which is a built-in memory, serves a work area and so on for the CPU 15. A read only memory (ROM) 27, which is a built-in memory, records and holds a program for the CPU 15, various modules used for execution of the program, data, and so on. In the present embodiment, the program, modules, and so on to be recorded in the ROM 27 may be supplied pre-installed on the digital video camera 11, but instead may be supplied through downloading from a server via the communication section 22 or may be supplied pre-recorded in various storage media.

The CPU 15 controls operations of the individual units by executing the program stored in the ROM 27. More specifically, upon detecting an operation of a power switch via the operation input section 23, the CPU 15 controls the power supply section 21 to start supplying power to the individual units, so that the entire operation is started up. Upon detecting an image capture instruction via the operation input section 23, the CPU 15 controls the optical lens section 12, the photoelectric conversion section 13, the camera function section 14, the video-signal processing section 16, the display section 17, the sound input/output section 19, and the audio processing section 20 to capture a subject's image, display an image for viewing, and output sound for listening. Upon detecting a recording-start instruction via the operation input section 23, the CPU 15 controls the operations of the video-signal processing section 16 and the drive 24 to compress video data and then record the compressed video data to the storage medium. Upon receiving a viewing instruction for the image-capture result recorded in the storage medium, the CPU 15 controls the video-signal processing section 16, the display section 17, the sound input/output section 19, the audio processing section 20, and the drive 24 to reproduce the video data and audio data from the storage medium, to display the preview image, and to output sound for preview. The digital video camera 11 uses a FAT (fat allocation table) file system to record and reproduce the video data and the audio data.

Figure 3:
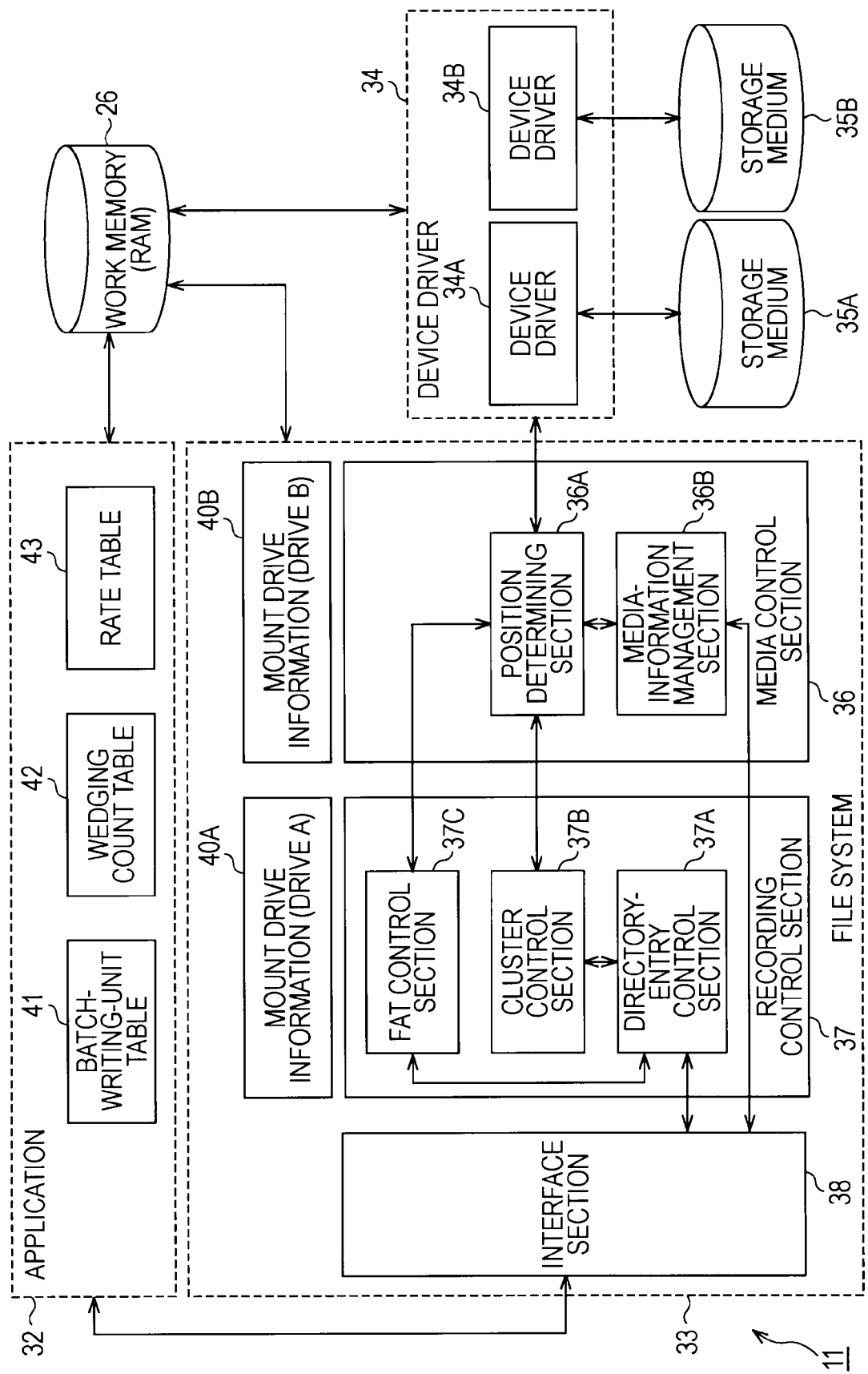
FIG. 3 is a diagram showing the system configuration of the digital video camera shown in FIG. 2.
Figure 15:
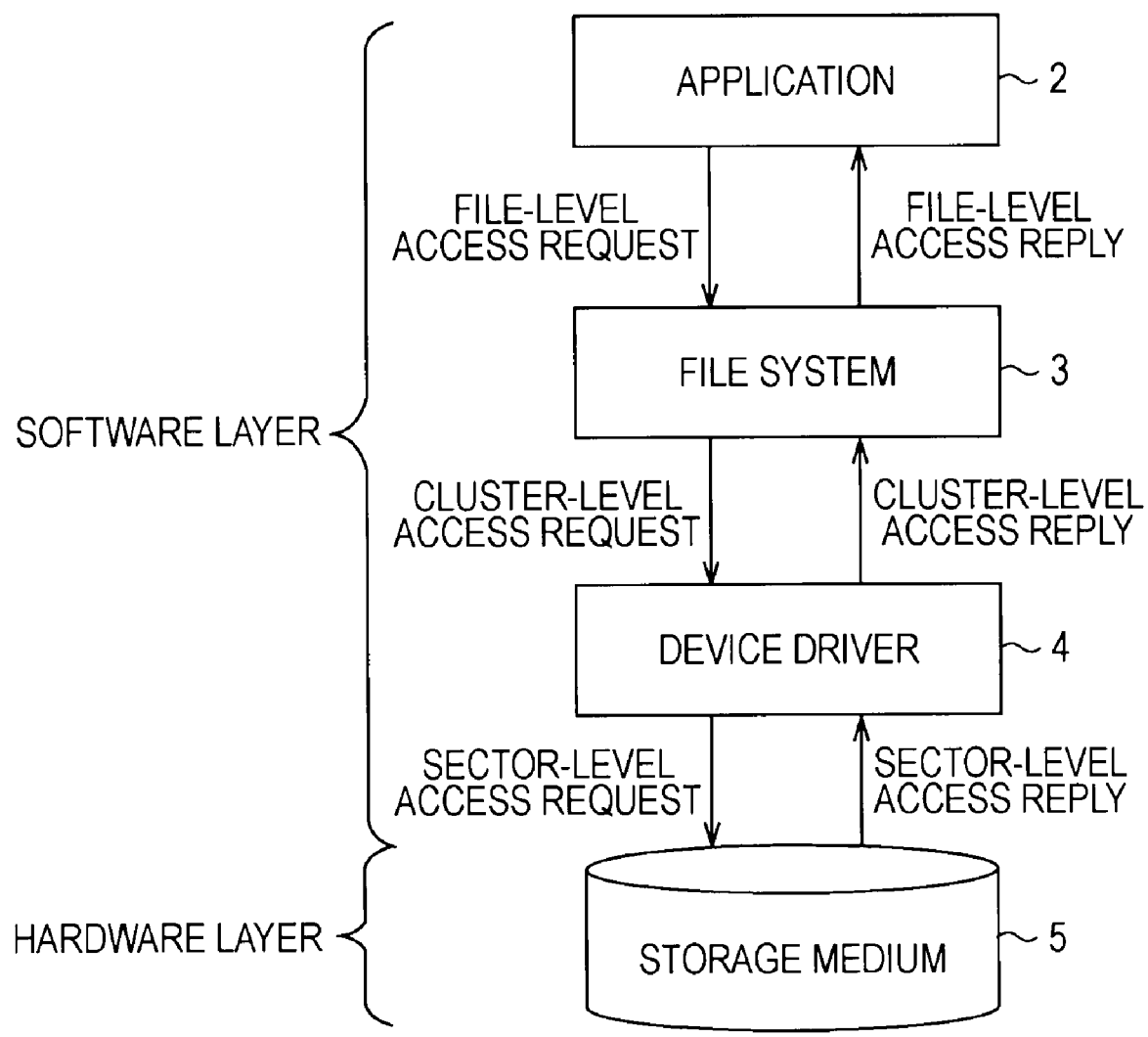
FIG. 15 is a diagram showing a typical system configuration of a FAT file system.
Figure 16:
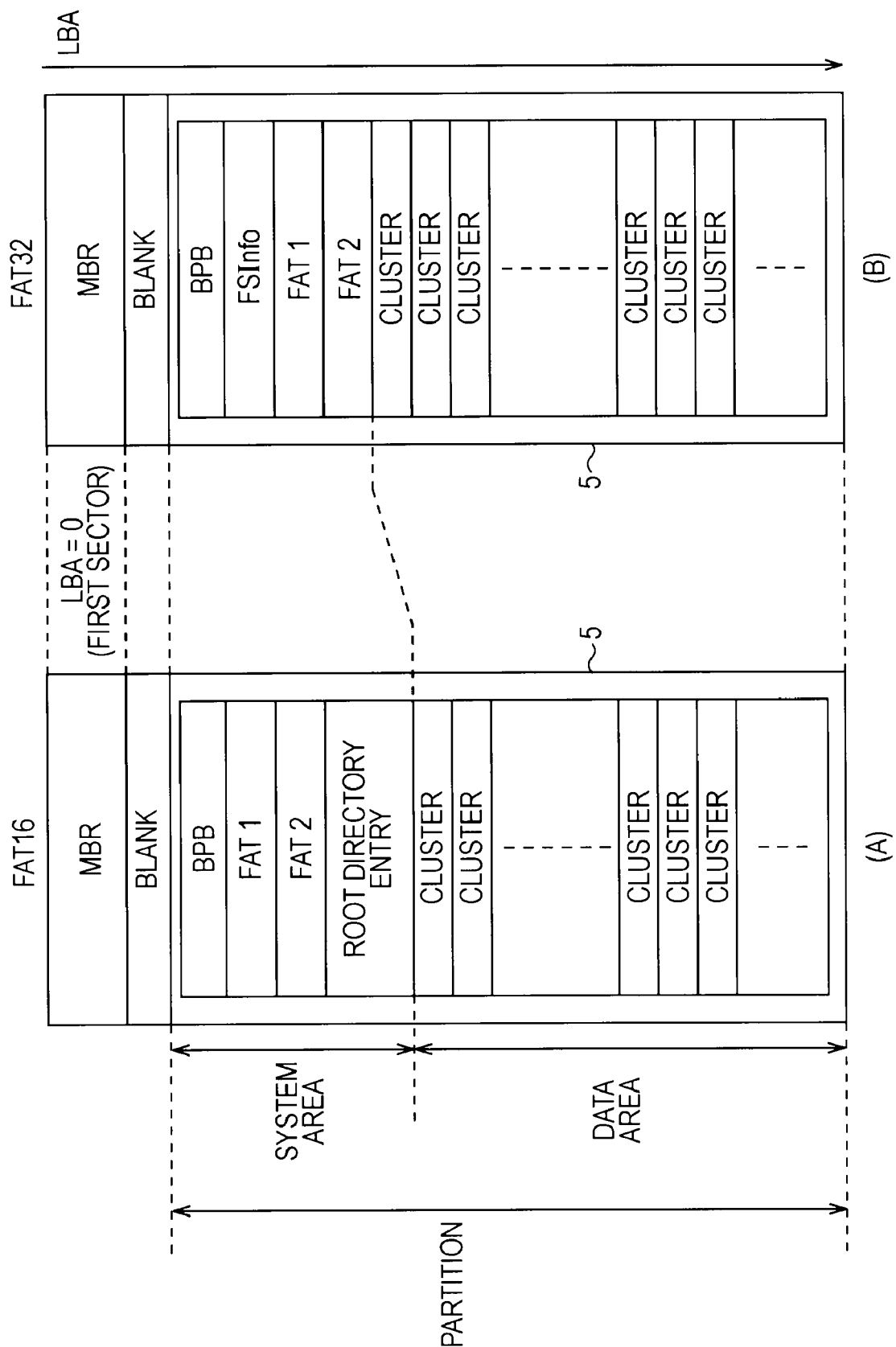
FIG. 16 shows a format of a FAT-file-system storage medium.
Figure 17:
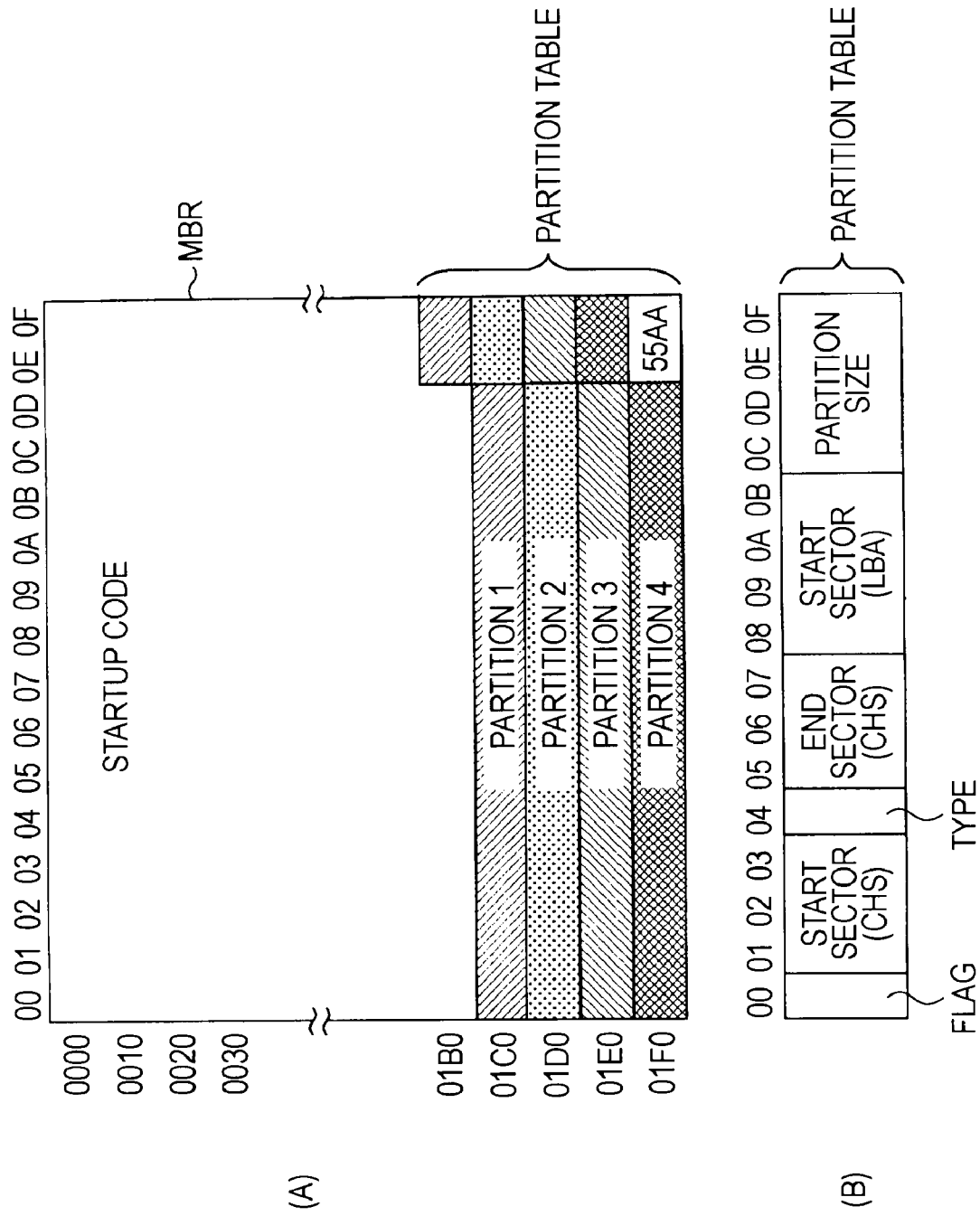
FIG. 17 shows an MBR in the format shown in FIG. 16.
Figure 18:
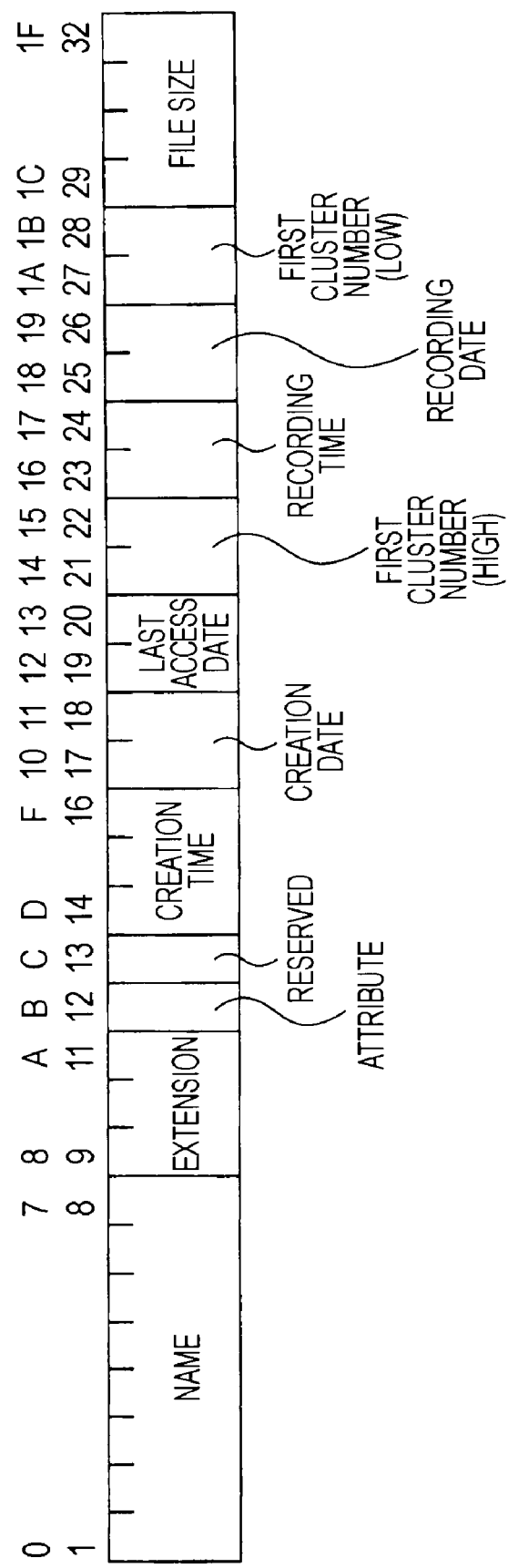
FIG. 18 shows a directory entry in the format shown in FIG. 16.

FIG. 3 is a block diagram showing the system configuration of a FAT file system of the digital video camera 11 in comparison with the configuration shown in FIG. 15. In the digital video camera 11, a file system layer 33, a device driver layer 34, and a hardware layer including storage media 35A and 35B and so on are sequentially provided below an application layer 32. FIG. 3 shows a case in which, of the hard disk device, the optical disk, the magneto-optical disk, and the memory card described above with reference to FIG. 2, only the hard disk device and the memory card are provided. Thus, the storage media 35A and 35B are the hard disk drive and the memory card. The device driver layer 34 includes device driver layers 34A and 34B, which correspond to the hard disk device and the memory card, respectively. Under the control of the file system layer 33, the device driver layers 34A and 34B execute data recording, reproducing, and so on on the storage media 35A and 35B. The application layer 32, the file system layer 33, and the device driver layer 34 store, in the RAM 26, parameters used for processing of the individual units, data to be recorded to the storage media 35A and 35B, data reproduced from the storage media 35A and 35B, and so on, and execute processing for each layer. Thus, the RAM 26 serves as a work memory for the application layer 32, the file system layer 33, and the device driver layer 34, and also serves as a buffer memory.

In response to an access request from the file system layer 33, the device driver layer 34 accesses the storage medium 35A or 35B, reads media information, information recorded in an MBR (master boot record), and the information of a system area and a data area, and outputs the read information. The media information indicates a type of storage medium to identify whether the storage medium is a memory card or a hard disk device. The media information further includes information that identifies a detailed type of storage medium. Thus, for example, when the storage medium is a memory card, the media information includes information that distinguishes among a general-purpose product, a high-grade product, and a standard-grade product. When the storage medium is a memory card using a flash memory, the media information includes information of an erase-block size. Similarly, in response to an access request from the file system layer 33, the device driver layer 34 records various data to the storage medium 35A or 35B.

Figure 4:
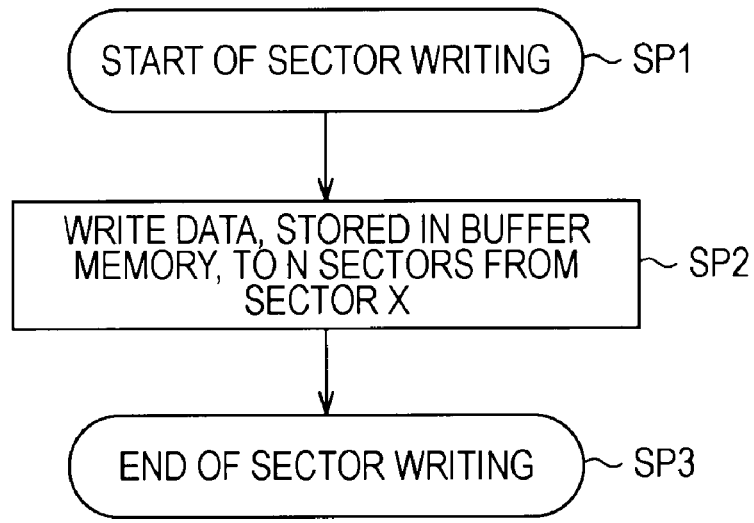
FIG. 4 is a flowchart showing a processing procedure for a device driver in the system configuration shown in FIG. 3.
Figure 5:
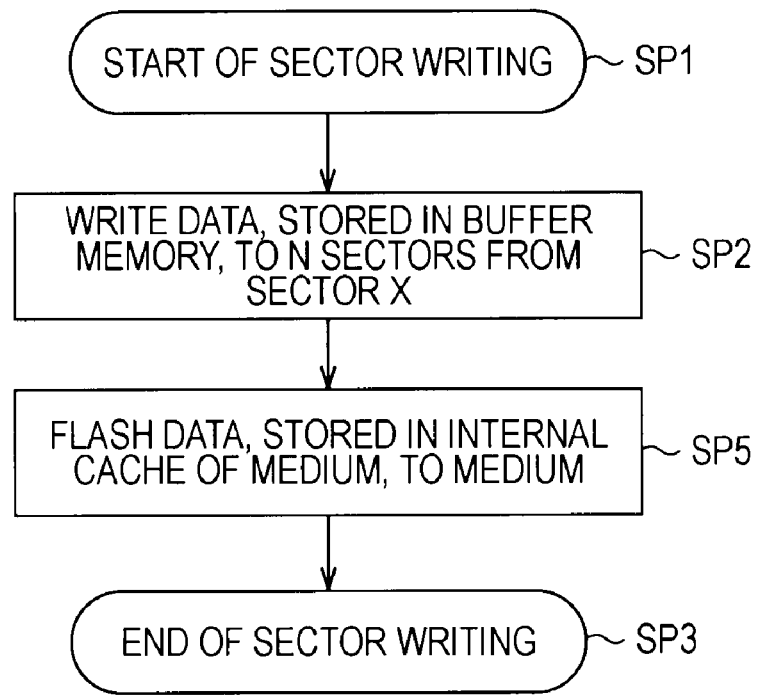
FIG. 5 is a flowchart showing another processing procedure for the device driver in the system configuration shown in FIG. 3.

For processing for recording data to the data area in the storage medium 35A or 35B, when each access request for each cluster is received from the file system layer 33, the device driver layer 34 executes a processing procedure in FIG. 4 or 5 to record the data to N sectors, included in one cluster, from a first sector X in the cluster specified by the file system layer 33.

FIG. 4 shows a processing procedure executed when an instruction for file writing that does not involve wedging processing, which is described below, is issued from the application layer 32. When the device driver layer 34 receives a recording instruction from the file system layer 33 in step SP1, the process proceeds to step SP2. In step SP2, the device driver layer 34 records data, stored in the buffer memory (the RAM) 26, to N sectors from a first sector X. The process then proceeds to step SP3, in which the device driver layer 34 ends the processing procedure and issues a notification of the processing completion to the file system layer 33.

FIG. 5 shows a processing procedure executed when an instruction for file writing that involves wedging processing, which is described below, is issued from the application layer 32. As shown in comparison with FIG. 4, upon completion of recording data to the N sectors in step SP2, the process proceeds to step SP5 in which the device driver layer 34 records data, stored in an internal cache of the storage medium, to the storage medium and flashes the cache memory. The process then proceeds to step SP3 and the processing procedure ends.

The file system layer 33 includes a media control section 36, a recording control section 37, and an interface section 38. The media control section 36 has a configuration corresponding to the storage media. Under the control of the recording control section 37, the media control section 36 controls recording/reproduction performed by the device driver layer 34. More specifically, in response to an instruction from the application layer 32, the media control section 36 obtains the media information and information recorded in the MBR and the system area from the storage medium 35A or 35B via the device driver layer 34. The media control section 36 sends the obtained media information and the information, recorded in the MBR, to the file system layer 33 via the interface section 38 in conjunction with information that identifies the drive that obtained the information. The media control section 36 also sends the obtained information, recorded in the system area, to the recording control section 37. The file system layer 33 holds the obtained media information and the information, recorded in the MBR, as mount drive information 40A or 40B of the corresponding drive.

Under the control of the recording control section 37, the media control section 36 issues an instruction for updating of the system area or recording/reproducing of the data area to the device driver layer 34. The media control section 36 has a position determining section 36A and a media-information management section 36B. The position determining section 36A identifies a recording/reproducing position in the storage medium 35A or 35B and executes recording/reproducing processing on the storage medium 35A or 35B. The media-information management section 36B manages processing of the media information and the information recorded in the MBR.

The recording control section 37 executes management of information recorded in the system area in the storage medium 35A or 35B and management of the data area therein. The recording control section 37 has a directory-entry control section 37A, a cluster control section 37B, and a FAT control section 37C. The directory-entry control section 37A manages directory entries of the storage medium 35A or 35B. More specifically, the directory-entry control section 37A obtains directory-entry information from the storage medium 35A or 35B via the media control section 36. During reproduction of a file, the directory-entry control section 37A detects the directory entry of the file on the basis of the obtained directory information and detects a first sector number. During recording of a file, the directory-entry control section 37A creates a directory entry corresponding to a cluster number detected by the FAT control section 37C and registers, in the system area of the storage medium 35A or 35B, the created directory entry via the media control section 36.

During recording of a file, the directory-entry control section 37A in the file system layer 33 sets a first-cluster number, a file name, an extension, and so on before starting the recording and then records the directory entry to the storage medium 35A or 35B. Upon completion of the recording of the file, the directory-entry control section 37A sets a file size and so on and re-records the directory entry. In the present embodiment, the processing for pre-recording the directory entry to the storage medium 35A or 35B is referred to as "file opening" and the processing for re-recording the directory entry is referred to as "file closing".

The FAT control section 37C manages the FAT areas of the storage media 35A and 35B. More specifically, the FAT control section 37C obtains information of the FAT area from the storage medium 35A or 35B via the media control section 36 and holds the obtained FAT area information. During reproduction of a file, the FAT control section 37C sequentially searches the FAT entries to detect a linked cluster number on the basis of the first-cluster number detected by the directory-entry control section 37A. During recording, the FAT control section 37C detects a cluster number of a blank area from the FAT entries and updates the records of the held FAT entries so as to correspond to the recording of data. The FAT control section 37C also updates the FAT areas of the storage media 35A and 35B on the basis of the updated FAT entries via the media control section 36.

In the present embodiment, each time a certain amount of data is recorded to the storage medium 35A or 35B, processing for updating the FAT areas of the storage media 35A and 35B and processing for updating the directory entries thereof are executed. The processing is herein referred to as "wedging processing". During wedging processing in the present embodiment, an EOF (end of file) is set in the FAT entries for a cluster to which last data is recorded and a file size and a time stamp in the directory entry are updated.

The cluster control section 37B manages the data areas of the storage media 35A and 35B. More specifically, on the basis of a cluster number detected by the FAT control section 37C and the directory-entry control section 37A, the cluster control section 37B identifies a cluster in the data area. The interface section 38 sends a command, received from the application layer 32, to the media control section 36 and the recording control section 37. The interface section 38 also sends a reply and so on, received from the media control section 36 and the recording control section 37, to the application layer 32.

In response to a user operation detected via the operation input section 23, the application layer 32 controls the operations of the individual units directly or via a module or the like. During the control, when video data obtained via the photoelectric conversion section 13 or the video input/output section 18 is recorded to the storage medium 35A or 35B, each time a certain amount of data is recorded thereto, the application layer 32 updates the FAT entries (which are management information) in the system area so as to correspond to recording of the data to the data area. In the present embodiment, the certain amount of data is managed according to a batch writing size and a wedging count period and is set so as to increase as the erase-block size increases.

Thus, the application layer 32 sets the batch writing size and the wedging period, on the basis of a batch-writing-unit table 41, a wedging count table 42, and a rate table 43. On the basis of the setting, the application layer 32 issues a data-recording instruction to the file system layer 33 for each amount of data based on the batch writing size and also issues an wedging instruction to the file system layer 33 at the wedging period.

As shown in FIG. 6, the batch-writing-unit table 41 is a table in which batch writing sizes, each of which represents an amount of data to be recorded to the storage medium 35A or 35B by a single write command from the application layer 32, are defined so as to correspond to erase-block sizes detected from the media information. The batch writing size in the batch-writing-unit table 41 has a value obtained by multiplying an erase-block size by a predetermined integer value M. As a result, as the erase-block size increases, the digital video camera 11 records a larger amount of data to the storage medium 35A or 35B by a single write command to reduce the frequency of wedging. This suppresses a reduction in the serviceable lives of the storage media 35A and 35B, the reduction being caused by the wedging. The integer value M may be a fixed value, such as 1 or 2, or may be varied according to, for example, the transfer speed of video data to be recorded. In the latter case, for example, as the transfer speed of the video data to be recorded increases, the integer value M may be increased so as not to prevent real-time recording of the video data. For the memory card, the default of the erase-block size is 256 KB and the erase-block size is set to an integer value of the default size. Since erase-block sizes are not defined for storage media, such as had disk devices, the batch writing size for the storage media is set to a predetermined reference value.

As shown in FIG. 7, the wedging count table 42 is a table in which, for each type of storage medium detected from the media information, a wedging period is defined by the number (the count value) of issuances of a write command to the file system layer 33. For a storage medium (a hard disk device (HDD)) in the example shown in FIG. 7) whose serviceable life is not reduced by the wedging processing, a value "1" indicating that the wedging processing is to be executed each time a write command is issued to the file system layer 33 is set in the wedging count table 42. In the case of a memory card that is a storage medium whose serviceable life is reduced by the wedging processing, the setting is performed so that the frequency of the wedging processing is increased for a storage medium whose serviceable life is less likely to be reduced by the wedging processing, that is, for a high-end user storage medium that is assumed to have a higher transfer speed of video data to be recorded. Thus, in FIG. 7, the count value is set to "8" is set for a most-commonly-used memory card (general purpose), the count value is set to "4" for a standard-grade memory card for a high-end user, and the count value is set to "2" is set for a high-grade memory card for a high-end user.

FIG. 8 shows, in comparison with FIGS. 6 and 7, a rate table 43 in which the batch writing sizes and the wedging periods are defined so as to correspond to the transfer rates for the storage media 35A and 35B, the transfer rates being determined through actual measurement. When the transfer rate for the storage media increases, real-time recording thereto is less likely to be impaired even the wedging processing is frequently executed. Thus, the batch writing size and the count value are set in the rate table 43 so that the frequency of the wedging processing increases according to an increase in the transfer rate. In other words, the batch writing size and the count value are set so as to decrease as the transfer rate increases. The batch writing size in the rate table 43 is also set to an integer multiple of the default size (256 KB) of the erase-block size described above with reference to FIG. 6. The integer value M shown in FIG. 8 may be equal to the integer value M set in the batch-writing-unit table 41 or may be different therefrom. The integer value M shown in FIG. 8 may also be a fixed value or may be a variable value, similarly to the integer value M set for the batch-writing-unit table 41.

Figure 1:
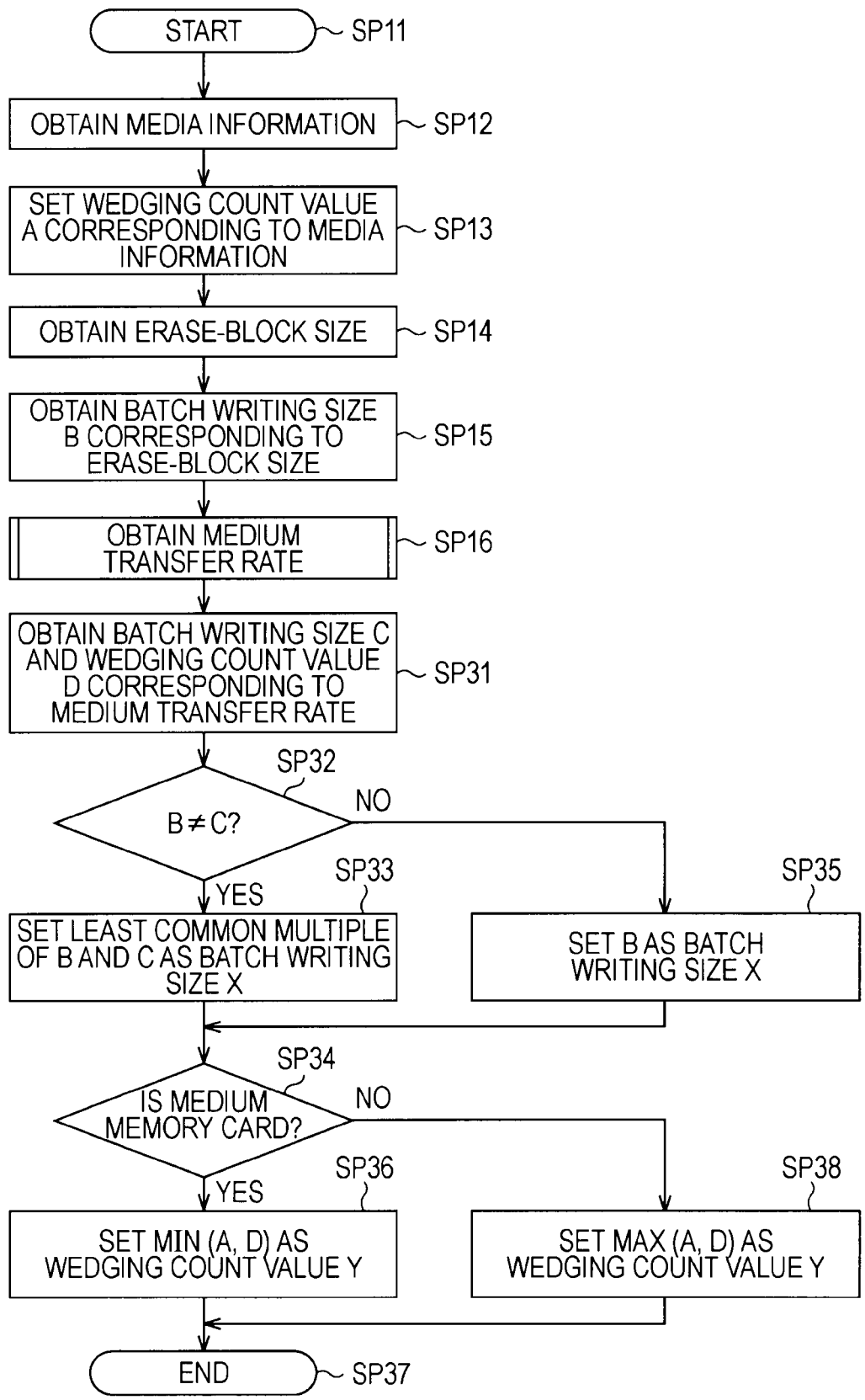
FIG. 1 is a flowchart showing a processing procedure for a central processing unit in a digital video camera according to a first embodiment of the present invention.

FIG. 1 is a flowchart showing a processing procedure for setting the batch writing size and the wedging period on the basis of the batch-writing-unit table 41, the wedging count table 42, and the rate table 43. Although this processing procedure is executed by the application layer 32, the file system layer 33, and the device driver layer 34, a description will be mainly given below in connection with the CPU 15 since the layers 32, 33, and 34 are mainly achieved by processing of the CPU 15.

Upon detecting the loading of the storage medium via the sensor 25, the CPU 15 starts the processing procedure in step SP11, and the process proceeds to SP12. In step SP12, the CPU 15 issues an instruction for obtaining the media information and so on from the loaded storage medium and obtains the media information and information for identifying the drive into which the storage medium is loaded. Subsequently, in step SP13, on the basis of the obtained information, the CPU 15 searches the wedging count table 42 to find a corresponding wedging count value A.

Subsequently, the process proceeds to step SP14 in which the CPU 15 detects an erase-block size on the basis of the media information obtained in step SP12. Next, in step SP15, on the basis of the detected erase-block size, the CPU 15 searches the batch-writing-unit table 41 to find a corresponding batch writing size B.

Subsequently, the process proceeds to step SP16 in which the CPU 15 actually measures the speed of data transferred to the storage medium. In this case, the CPU 15 actually measures the speed of data transferred to the storage medium on the basis of a time taken for writing a certain amount of data. More specifically, after issuing a data-write command for writing a certain amount of data to the storage medium, the CPU 15 measures, as the amount of time taken for the writing, a time until a reply indicating completion of the writing is received. The CPU 15 determines the data transfer speed on the basis of the measured time and the amount of written data.

Figure 9:
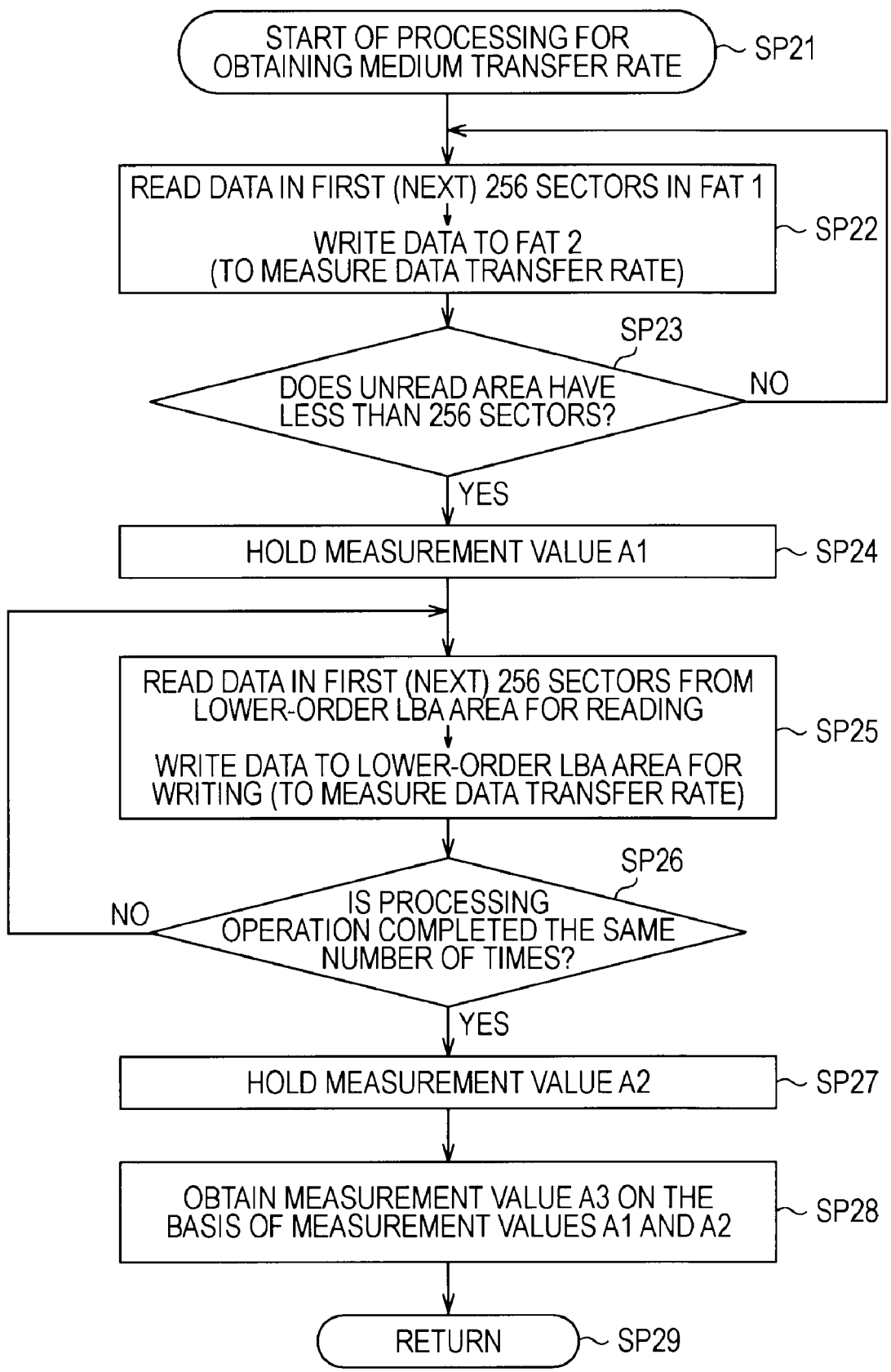
FIG. 9 is a flowchart showing a procedure for measuring a transfer rate.

FIG. 9 is a flowchart showing more details of the processing performed in step SP16. FIG. 9 shows a case in which a main FAT area is FAT 1 and a backup FAT area is FAT 2.

When the CPU 15 starts the processing procedure in step SP21, the process proceeds to step SP22. In step SP22, the CPU 15 reads data in first 256 sectors in the main FAT area, stores the read data in the buffer memory 26, and then records the data to a corresponding area in the backup FAT area. The CPU 15 measures a time after a write command issued until when a write-completion command is obtained.

The process then proceeds to step SP23, in which the CPU 15 determines whether or not an area from which data reading has not been performed in the main FAT area has less than 256 sectors. When a negative result is obtained, the process returns to step SP22 in which the CPU 15 executes a similar operation on next 256 sectors. Thus, the CPU 15 repeats the operation in step SP22 a number of times, and when an affirmative result is obtained in step SP23, the process proceeds from step SP23 to step SP24.

In step SP24, the CPU 15 calculates a data transfer speed from the time measurement results obtained by the repeated operations in step SP22. That is, the CPU 15 calculates a data transfer speed by adding the time measurement values obtained by the repeated operations in step SP22 and dividing "the number of repeated operations in step SP22"×"the amount of data of 256 sectors" by the value resulting from the addition. The data transfer speed may be determined by obtaining multiple data-transfer-speed measurement values, each measurement value being obtained by dividing the amount of data of 256 sectors by the time measurement value obtained each time step SP22 is executed, and averaging the multiple measurement values.

Subsequently, the process proceeds to step SP25, in which the CPU 15 issues a write command to an area that is different from the area processed in step SP22 and measures a time taken for the writing. The area used for the time measurement in step SP25 is an area in which the time taken for the writing is assumed to differ most greatly from the area subjected to the time measurement performed in step SP22. More specifically, although the time measurement is performed on the FAT area in step SP22, the CPU 15 executes time measurement processing on a lowest-order LBA area in the data area in step SP25.

That is, in step SP25, by referring to records in the FAT area, the CPU 15 sequentially detects, in a lower-order LBA area, the cluster number of a cluster in which data is recorded. On the basis of the detected cluster number, the CPU 15 stores data of 256 sectors from a lower-order LBA area and stores the read data in the buffer memory 26. The data stored in the buffer memory 26 is sequentially recorded to a lower-order LBA blank area, and the CPU 15 measures a time taken for the writing.

Subsequently, the process proceeds to step SP26, in which the CPU 15 determines whether or not the processing operation in step SP25 is repeated the same number of times as the number of processing operations repeated in step SP22. When a negative result is obtained, the process returns to step SP25, in which the CPU 15 reads data from a next area, records the read data to the storage medium, and measures a time taken for the writing, in the manner described above. When the processing in step SP25 is repeated the predetermined number of times, an affirmative result is obtained in step SP26 and the process proceeds to step SP27. In step SP27, the CPU 15 calculates a transfer rate on the basis of the writing time measured in step SP25, as in step SP24.

Next, in step SP28, the CPU 15 calculates the transfer rate for the storage medium by, for example, averaging the transfer rates calculated in steps SP24 and SP27. Thereafter, the process proceeds to step SP29 to return to the initial processing procedure.

Although a case in which the data transfer speeds are measured using the backup FAT area and the lower-order LBA area has been described in the example shown in FIG. 9, only one of the areas or another area may be used to measure the data transfer speed as long as practically sufficient measurement accuracy is ensured. Also, instead of reproducing data recorded in the storage medium and using the reproduced data for measuring the data transfer speed, other data, such as internally generated dummy data, can also be used for the measurement.

Referring to FIG. 1, when the CPU 15 measures the data transfer speed in step SP16, the process proceeds from step SP16 to step SP31. In step SP31, on the basis of the transfer rate determined in step SP16, the CPU 15 searches the rate table 43 to find a corresponding batch writing size C and a wedging count value D.

The process then proceeds to SP32, in which the CPU 15 determines whether or not the batch writing size B determined from the batch-writing-unit table 41 is different from the batch writing size C determined from the rate table 43. When an affirmative result is obtained in step SP32, the process proceeds to step SP33 in which the CPU 15 sets, as a batch writing size X, a least common multiple of the batch writing size B determined from the batch-writing-unit table 41 and the batch writing size C determined from the rate table 43, and then the process proceeds to step SP34.

On the other hand, when a negative result is obtained in step SP32, the process proceeds to step SP35 in which the CPU 15 sets, as the batch writing size X, the batch writing size B determined from the batch-writing-unit table 41, and then the process proceeds to step SP34.

In step SP34, the CPU 15 determines whether or not the storage medium is limited in the number of recording operations. That is, the CPU 15 determines whether or not the storage medium is a memory card. When an affirmative result is obtained in step SP34, the process proceeds to step SP36 in which the CPU 15 sets, as a wedging count value Y, a smaller one of the count value A determined from the wedging count table 42 and the count value D determined from the rate table 43. Thereafter, the process proceeds to step SP37 and the processing procedure ends.

On the other hand, when a negative result is obtained in step SP34, the process proceeds to step SP38 in which the CPU 15 sets, as the wedging count value Y, a larger one of the count value A determined from the wedging count table 42 and the count value D determined from the rate table 43. Thereafter, the process proceeds to step SP37 and the processing procedure ends.

Figure 10:
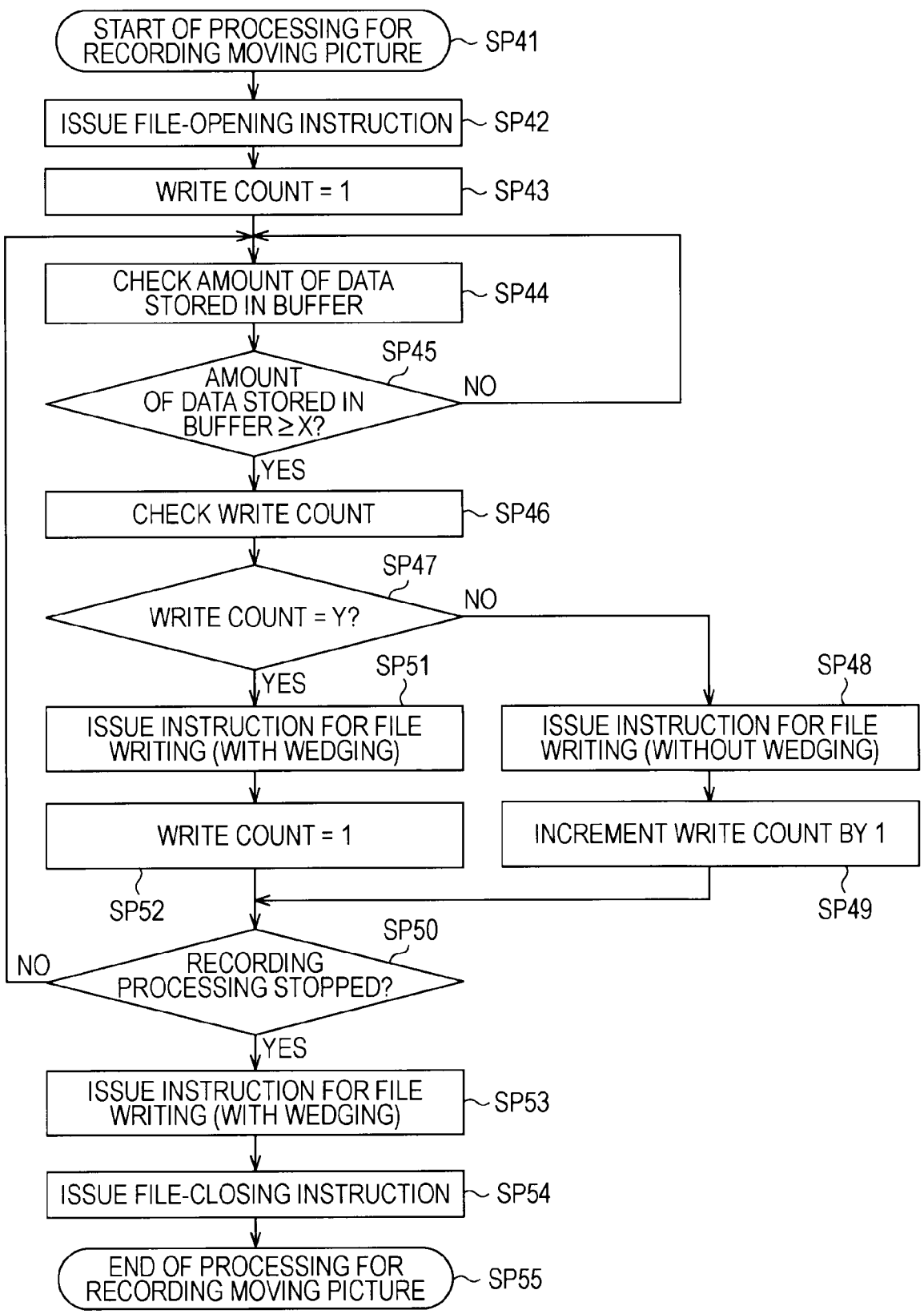
FIG. 10 is a flowchart showing a processing procedure during data recording.

When an instruction for recording data to the storage medium is issued via the operation input section 23, the CPU 15 issues a write command from the application layer 32 to the file system layer 33 and also issues a wedging instruction, on the basis of the batch writing size X and the wedging count value Y set in the processing procedure in FIG. 1. FIG. 10 is a flowchart showing a processing procedure for the CPU 15 during the recording. When recording to the storage medium is started in step SP41, the process proceeds to step SP42, in which the CPU 15 issues a file-opening instruction. By issuing the file-opening instruction, the CPU 15 causes the directory-entry control section 37A (shown in FIG. 3) to create a directory entry in which a file name, an extension, a start cluster, and so on are set, and to record the directly entry to the storage medium.

The process then proceeds to step SP43, in which the CPU 15 initializes a write count for counting the periods of the wedging processing to "1". The process then proceeds to step SP44, in which the CPU 15 checks the amount of stored video data and audio data to be recorded to the storage medium. Next, in step SP45, the CPU 15 determines whether or not the amount of stored video data and audio data is greater than or equal to the batch writing size X. When a negative result is obtained, the process returns to step SP44. Thus, the CPU 15 repeats the processing operations in steps SP44 and SP45 until the amount of stored video data and audio data to be recorded to the storage medium is greater than or equal to the batch writing size X. When the amount of stored data is greater than or equal to the batch writing size X, an affirmative result is obtained in step SP45 and the process proceeds to step SP46.

In step SP46, the CPU 15 detects a write count value. In step SP47, the CPU 15 determines whether or not the write count value is equal to the wedging count value Y. When a negative result is obtained in step SP47, the process proceeds to step SP48 in which the CPU 15 issues an instruction for writing the video data and audio data stored in the buffer memory 26 according to the batch writing size X. The writing performed in step SP48 is executed by the processing procedure (described above with reference to FIG. 4) that does not involve the wedging processing.

The process then proceeds to step SP49 in which the CPU 15 increments the write count value by 1 and the process proceeds to step SP50. In step SP50, the CPU 15 determines whether or not an instruction for stopping the recording processing is issued via the operation input section 23. When a negative result is obtained, the process returns to step SP44. Thus, the CPU 15 repeats the operations in steps SP48 and SP49 while sequentially incrementing the write count value, and issues a command for performing writing for each batch writing size X to record the video data and the audio data to the storage medium. When the number of repeated operations reaches the wedging count value Y, an affirmative result is obtained in step SP47 and the process proceeds to step SP51.

In step SP51, the CPU 15 issues an instruction for writing the video data and audio data, stored in the buffer memory 26, according to the batch writing size X. Upon completion of the writing, the CPU 15 issues an instruction for executing the wedging processing. The writing performed in step SP51 is executed by the writing processing procedure (described above with reference to FIG. 5) that involves flashing. The process then proceeds to step SP52 in which the CPU 15 initializes the write count value to 1 and the process proceeds to step SP50.

In step SP50, the CPU 15 determines whether or not an instruction for stopping the recording processing is issued via the operation input section 23. When a negative result is obtained, the process returns to step SP44. Thus, the CPU 15 repeats recording of video data and audio data for each batch writing size X, and each time the number of repetitions reaches the wedging count value Y, the CPU 15 executes the wedging processing.

During the repetition of the recording of video data and audio data, when an instruction for stopping the recording processing is issued from the user, an affirmative result is obtained in step SP50 and the process proceeds to step SP53. In step SP53, the CPU 15 issues an instruction for writing video data and audio data that remain in the buffer memory 26. Upon completion of the writing, the CPU 15 issues an instruction for executing the wedging processing. The writing performed in step SP53 is also executed by the writing processing procedure (described above with reference to FIG. 5) that involves flashing.

The process then proceeds to step SP54, in which the CPU 15 issues a file-closing instruction. By issuing the file-closing instruction, the CPU 15 causes the directory-entry control section 37A (shown in FIG. 3) to re-create a directory entry by further setting a file size and so on in the directory entry created during the file opening and re-records the directory entry to the storage medium. Upon completion of the file closing processing, the process of the CPU 15 proceeds to step SP55 and the processing procedure ends.

Figure 11:
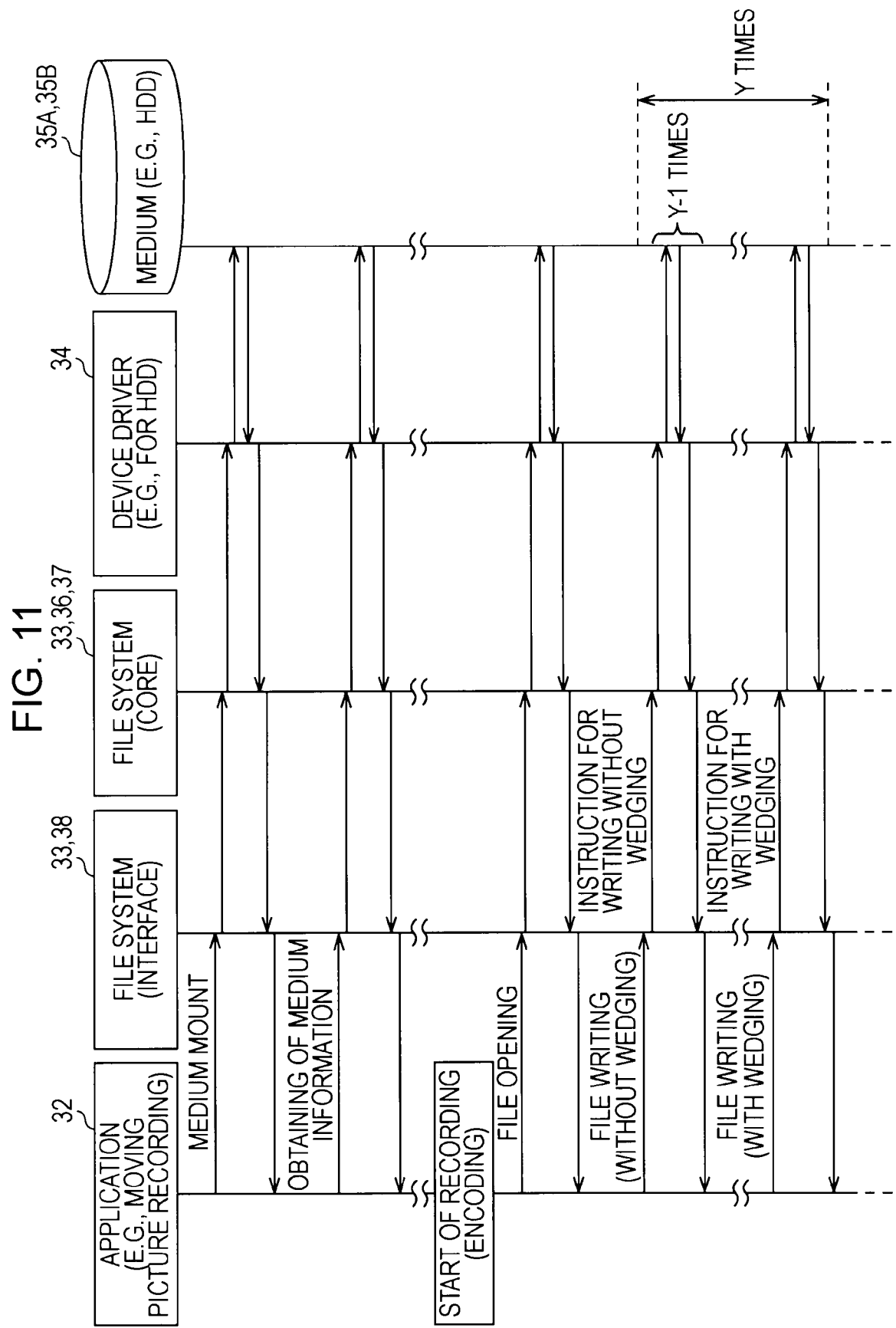
FIG. 11 is a time chart when recording is started, the time chart corresponding to the processing procedure shown in FIG. 10.
Figure 12:
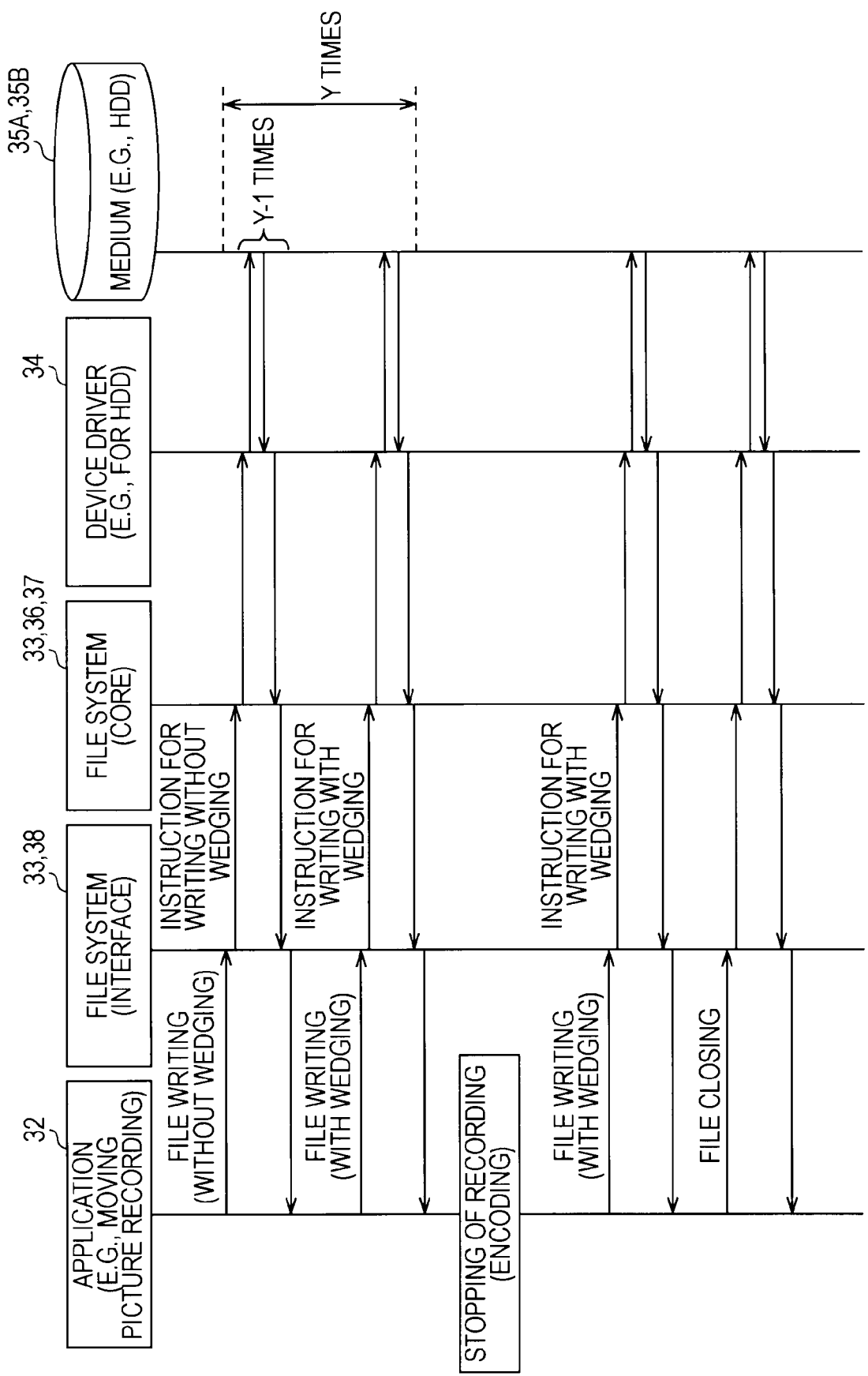
FIG. 12 is a time chart when the recording is completed, the time chart corresponding to the processing procedure shown in FIG. 10.

FIGS. 11 and 12 are time charts showing procedures of processing that is performed by the CPU 15 on the storage medium. FIGS. 11 and 12 show processing obtained by summarizing the processing of FIGS. 1, 3, 10, and so on into a layer model.

When the sensor 25 detects loading of the storage medium 35A or 35B, the CPU 15 causes the application layer 32 to issue an instruction for mounting, as indicated by "Media Mount" in FIG. 11. In accordance with the mount instruction, the file system layer 33 (including the media control section 36, the recording control section 37, and the interface section 38) controls the device driver layer 34 to reproduce information of a FAT area, information of directory entries, and so on from the storage medium 35A or 35B, and holds the reproduced information. Consequently, the CPU 15 sets the loaded storage medium 35A or 35B to be accessible by the application layer 32.

Subsequently, the CPU 15 causes the application layer 32 to issue a media-information obtaining instruction to the file system layer 33, as indicated by "Obtaining of Media Information" in FIG. 11. In accordance with the media-information obtaining instruction, the file system layer 33 controls the device driver layer 34 to obtain media information from the storage medium 35A or 35B, and sends the media information to the application layer 32.

When recording (encoding) is started, the CPU 15 causes the application layer 32 to issue a file-opening instruction to the file system layer 33, as indicated by "File Opening" in FIG. 11. In accordance with the instruction, the recording control section 37 provided in the file system layer 33 controls the device driver layer 34 to record a directory entry to the storage medium 35A or 35B, and sends a reply indicating the recording to the application layer 32.

As indicated by "File Writing (Without Wedging)" in FIGS. 11 and 12, the CPU 15 issues a command for file writing that does not execute the wedging processing and that is based on the batch writing size X to the file system layer 33 Y−1 times. Each time the file system layer 33 receives the file write command, the file system layer 33 detects a blank area, and repeatedly issues a file write command for each cluster to the device driver layer 34. For each file write command for each cluster, the CPU 15 also causes the device driver layer 34 to repeatedly issue a file write command for each sector, so that the writing to the storage medium 35A or 35B according to the batch writing size X is repeated Y−1 times.

When the writing according to the batch writing unit size X is repeated Y−1 times, the CPU 15 issues a command for file writing that executes the wedging processing and that is based on the batch writing size X to the file system layer 33, records data based on the batch writing size X to the storage medium 35A or 35B, and executes the wedging processing, as indicated by "File Writing (With Wedging)" in FIGS. 11 and 12.

The CPU 15 records continuous video data and audio data to the storage medium 35A or 35B by repeating the issuance of the command for file writing that that does not execute the wedging processing and that is based on the batch writing size XY−1 times and the issuance of the command for file writing that executes the wedging processing and that is based on the batch writing size X.

Also, in response to an instruction for stopping the recording (encoding), the CPU 15 issues a command for file writing that involves the wedging processing, with respect to the video data and audio data that remain in the buffer memory 26. Based on the command, the remaining video data and audio data are recorded to the storage medium 35A or 35B and then the wedging processing is executed.

Subsequently, as indicated by "File Closing" in FIG. 12, the application layer 32 issues a file-closing instruction to the file system layer 33, so that the directory entry recorded in the storage medium 35A or 35B by the file opening is updated.

(2) Operation of Embodiment

In the above-described configuration, in the digital video camera 11 (in FIG. 2), video data obtained by the optical lens section 12, the photoelectric conversion section 13, and the video-signal processing section 16 and audio data obtained by the sound input/output section 19 and the audio processing section 20 are input to the CPU 15, are compressed thereby, and are recorded to the storage medium via the drive 24. As described above, the digital video camera 11 uses a FAT file system for the storage media. Thus, in the case of the scheme of the related art, after data is sequentially recorded to the data area of the storage medium cluster by cluster, management information (FAT entries and directory entries) in the system area, which is a management area, is updated so as to correspond to the records in the data area to thereby complete recording of one file.

In the digital video camera 11, however, video data and audio data may be recorded for a long period of time, and power shut down during recording, accidental dropping, or the like may make it difficult to perform recording. In such a case, when the management information is updated after completion of the recording of all data, as in the related art, precious video data and audio data that have already been recorded become unusable.

Accordingly, in the present embodiment, each time a certain amount of data is recorded, linked clusters and an EOF are set in the FAT entries so as to correspond to the recording of the certain amount of data and the wedging processing is executed. As a result, when an accident or the like makes it difficult for the digital video camera 11 to record data during recording, video data and audio data that have already been recorded can be reproduced up to a portion on which the wedging processing was performed. Thus, it is possible to effectively use the precious video data and audio data that have already been recorded.

However, a flash memory, which is limited in the number of recording operations, may be used as the storage medium for the digital video camera 11. In the flash memory, erasing and updating of recorded data are executed for each erase block. Thus, simply executing the wedging processing each time a certain amount of data is recorded means that data in a certain erase block is repeatedly updated and thus the serviceable life is reduced.

In particular, a storage medium using a flash memory has various different erase-block sizes. Thus, simply executing the wedging processing each time a certain amount of data is recorded means that, for a storage medium having a large erase-block size, the same erase block is updated many times and thus the serviceable life is reduced significantly.

Accordingly, in the present embodiment, upon mounting of a storage medium, the media information is obtained from the storage medium and the type of storage medium is detected (in FIGS. 1 and 3). When it is determined based on the detection result and the wedging count table 42 that the storage medium is a hard disk device or the like whose serviceable life is not reduced by the wedging processing, the wedging count value is set to "1" (in FIGS. 1 and 7) so that the wedging processing is executed each time a write command is issued to the file system layer 33. When it is determined that the storage medium is a memory card or the like whose serviceable life is reduced by the wedging processing, the wedging count value is set in accordance with the type of storage medium.

In the digital video camera 11, the batch writing size is set based on the batch-writing-unit table 41 so that the size of batch writing for recording to the storage medium by a single write command issued from the application layer 32 increases as the erase-block size detected from the media information increases (in FIGS. 1 and 6).

In the digital video camera 11, the application layer 32 issues a write command based on the batch writing size to the file system layer 33 to record video data and audio data to the storage medium. Further, each time the number of issuances of the write command reaches the wedging count value, the wedging processing is executed and linked cluster numbers and an EOF are set in the FAT entries so as to corresponding to the already performed recording.

Thus, in the digital video camera 11, a certain amount of data for performing the wedging processing is managed using the batch writing size and the wedging count value, and as the erase-block size increases, a larger amount of data is recorded to the data area, and the wedging processing is executed. Thus, even when the erase-block size is large, it is possible to reduce the concentrated updating of data to the same erase block and it is possible to suppress a significant reduction in the serviceable life.

When the storage medium is a hard disk device or the like, each time a write command is issued to the file system layer 33, the wedging processing can be executed so as to minimize loss of precious data.

In the digital video camera 11, the certain amount of data for performing the wedging processing is set to an integer multiple of the batch writing size on the basis of the wedging count value and the batch writing size is also set to an integer multiple of the erase-block size. Thus, when the wedging count values are equal to each other, the number of operations of the wedging processing on the same erase block can be set to the same regardless of the erase-block size. Thus, since the certain amount of data for the wedging processing is set to an integer multiple of the erase-block size, it is also possible to suppress a significant reduction in the serviceable life of the storage medium.

In the digital video camera 11, further, the data transfer speed for the storage medium is determined through the actual measurement, and in accordance with the data transfer speed, the batch writing size and the wedging count value (shown in FIG. 8) are determined. More specifically, the setting is performed so that, as the data transfer speed increases, the batch writing size is reduced and the intervals of the wedging are reduced.

The digital video camera 11 compares the batch writing size based on the data transfer speed with the batch writing size based on the batch-writing-unit table 41. When the batch writing sizes do not match each other, a least common multiple of the batch writing sizes is set as the ultimate batch writing size, whereas, when the batch writing sizes match each other, these batch writing sizes are set as the ultimate batch writing size.

Thus, in the digital video camera 11, for example, when the storage medium is a high-end user standard-grade memory card having an erase-block size of 1 MB and a data transfer speed of 45 Mbps, the least common multiple "2 MB" of the batch writing size "1 MB" determined from the batch-writing-unit table 41 and the batch writing size "2 MB" determined from the data transfer speed is set as the ultimate batch writing size. In this case, the batch writing size based on the data transfer speed is set to an integer multiple of the erase-block size, thus making it possible to suppress a significant reduction in the serviceable life of the storage medium.

In the digital video camera 11, similarly, the wedging count value determined from the data transfer speed is compared with the wedging count value determined from the wedging count table 42. When the storage medium is a memory card or the like, a smaller one of the count values is set as an ultimate wedging count value. Thus, when the storage medium is the above-described high-end user standard-grade memory card having an erase-block size of 1 MB and a data transfer speed of 45 Mbps, a count value "2" based on the count value "4" determined from the wedging count table 42 and the count value "2" determined from the data transfer speed is set as the ultimate wedging count value.

Thus, for the memory card, the ultimate batch writing size and the wedging count value are set to 2 MB and 2, respectively.

As a result, for the memory card, the write command is less frequently issued to record video data and audio data than a case in which the batch writing size and the wedging count value are simply determined from the batch-writing-unit table 41 and the wedging count table 42, respectively. Thus, in this case, a data-transfer-speed reduction caused by repeated issuances of the write command can be suppressed compared to a case in which the batch writing size and the wedging count value are simply determined from the batch-writing-unit table 41 and the wedging count table 42, respectively. The arrangement, therefore, allows the video data and the audio data to be more reliably recorded to the storage medium in real time.

When the storage medium is not a memory card or the like, a larger one of the above-described count values is set as the ultimate count value. That is, when the storage medium is not a memory card or the like, even an increase or reduction in the frequency of the wedging does not cause any reduction in the serviceable life of the storage medium. Thus, in this case, it is possible to reduce the frequency of the wedging processing so as to prevent impairment of real time recording.

Accordingly, in the digital video camera 11, the certain amount of data for updating the management information is managed using the size of batch writing for performing recording by a single write command and the count value for setting the period of time for updating the management information, the count value corresponding to the number of issuances of the write command. Further, a value is selected from the value determined from the erase-block size and the value determined from the data transfer speed and is set as the batch writing size. When the storage medium is a hard disk device or the like, the processing is performed so as to prevent loss of precious data, and when the storage medium is a memory card or the like, video data and audio data can be more reliably recorded to the storage medium in real time. Accordingly, it is possible to record various types of data to the storage medium in accordance with the type of storage medium.

(3) Advantage of Embodiment

According to the arrangement described above, the management information is updated each time the certain amount of data is recorded, and when the storage medium is a flash memory or the like, the certain amount of data is increased according to an increase in the erase-block size. Thus, when records in the FAT entries or the like are updated each time the certain amount of data is recorded, it is possible to suppress a significant reduction in the serviceable life of the storage medium.

In addition, since the certain amount of data is an integer multiple of the erase-block size, it is also possible to suppress a significant reduction in the serviceable life of the storage medium.

Also, the certain amount of data is managed using the size of batch writing for performing recording by a single write command and the count value for setting the period of time for updating the management information, the count value corresponding to the number of issuances of the write command, and the ultimate batch writing size is set on the basis of a value corresponding to the batch writing size determined from the erase-block size and a value corresponding to a batch writing size determined from the data transfer speed. Thus, it is possible to appropriately record various types of data to the storage medium in accordance with the type of storage medium.

In addition, since the batch writing size has an amount of data corresponding to an integer multiple of the erase-block size, it is also possible to suppress a significant reduction in the serviceable life of the storage medium.

Second Embodiment

Figure 13:
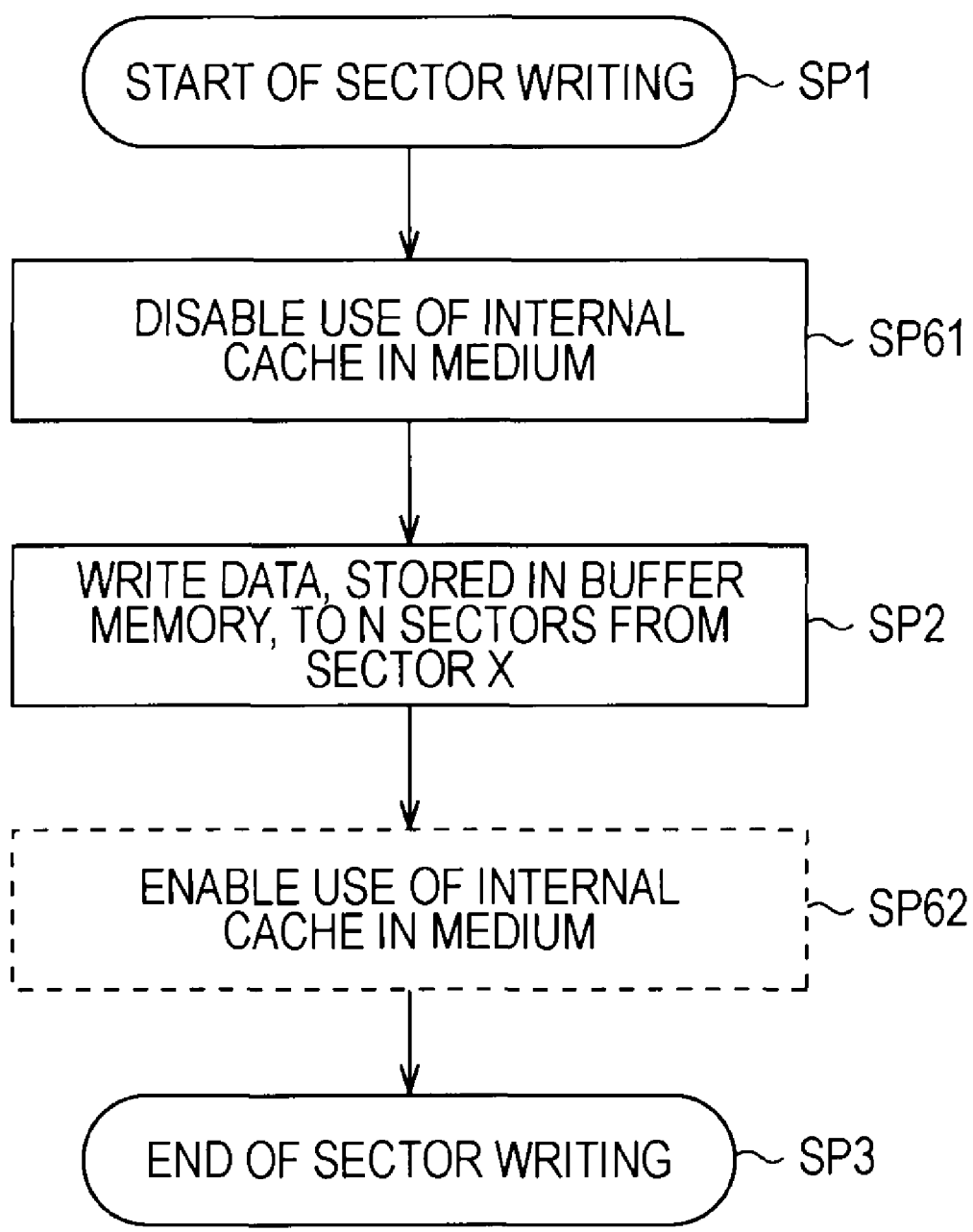
FIG. 13 is a flowchart showing a processing procedure for a device driver in a digital video camera according to a second embodiment of the present invention.

FIG. 13 is a flowchart showing, in comparison with FIGS. 4 and 5, a processing procedure for a device driver layer of a digital video camera according to a second embodiment of the present invention. The digital video camera according to the second embodiment has the same configuration as that of the above-described first embodiment, except that an arrangement for the processing procedure for the device driver layer is different.

Under the control of the application layer via the file system layer, the device driver layer in the second embodiment dynamically switches processing for the cache. Thus, the processing procedure includes steps SP61 and SP62 for processing for switching use of the cache.

Thus, a case in which the device driver layer dynamically switches processing for the cache, as in the present embodiment, can also provides the same advantages as the above-described first embodiment.

Third Embodiment

Figure 14:
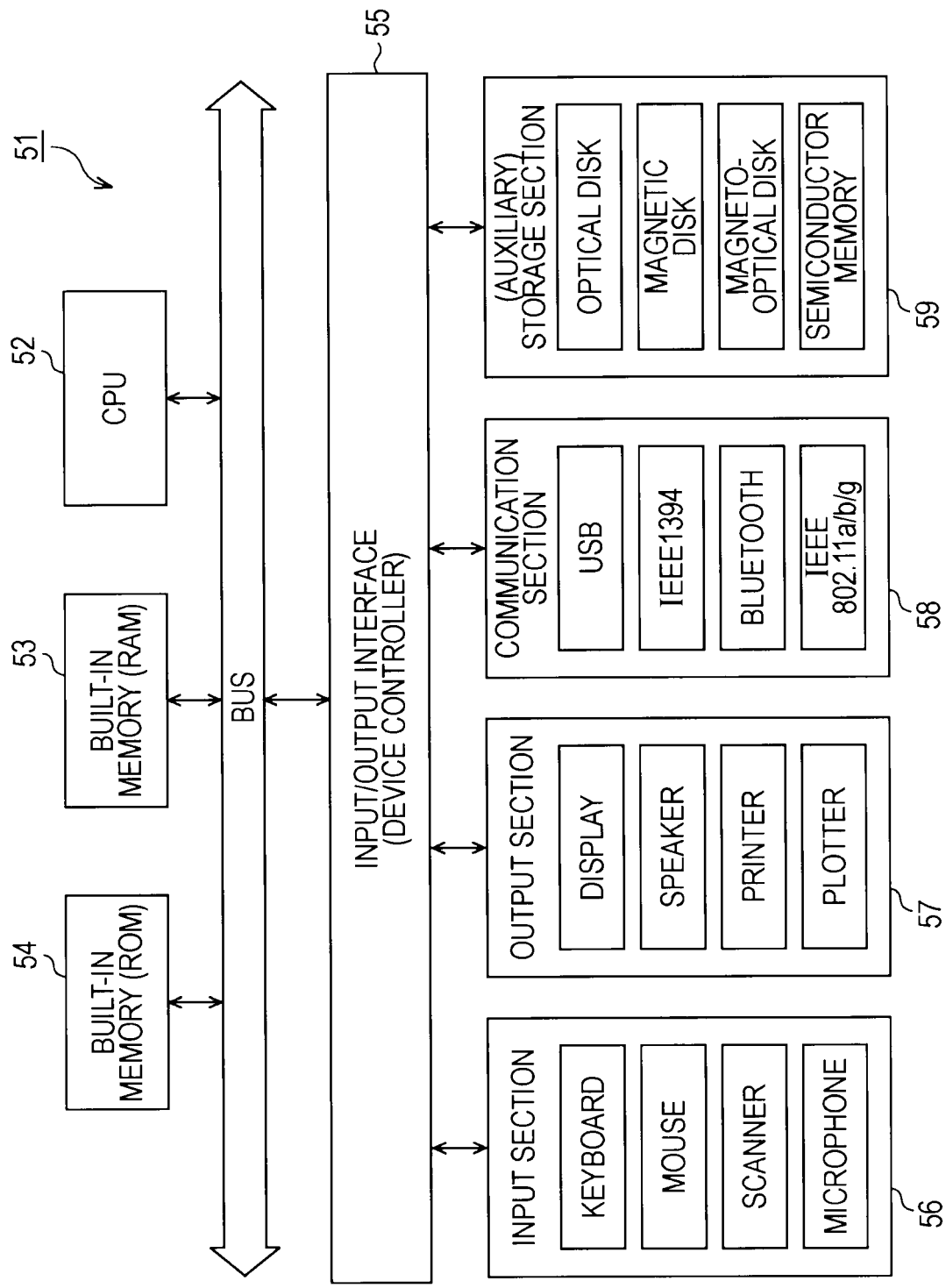
FIG. 14 is a block diagram showing the configuration of a computer according to a third embodiment.

FIG. 14 is a block diagram showing a computer that serves as a recording apparatus according to a third embodiment of the present invention. A computer 51 includes a CPU 52, a built-in RAM 53, and a built-in ROM 54, which are interconnected through a bus. Various interfaces are also connected to the bus via an input/output interface 55, which serves as a device controller. The interfaces for the computer 51 include an input section 56, an output section 57, a communication section 58, and an auxiliary storage section 59. Examples of the input section 56 include a keyboard, a mouse, a scanner, and a microphone. Examples of the output section 57 include a display, a speaker, a printer, and a plotter. Examples of the communication section 58 include a USB interface, an IEEE 1394 interface, a Bluetooth interface, and an IEEE 802.11a/b/g interface. Examples of the auxiliary storage section 59 include an optical disk, a magnetic disk, a magneto-optical disk, and a semiconductor memory. A FAT file system is used for each storage medium included in the auxiliary storage section 59 for the computer 51, and data is recorded to each storage medium in the same manner as the first embodiment.

The computer according to the embodiment of the present invention can also provide the same advantages as the above-described embodiments.

Fourth Embodiment

Although cases in which a FAT file system is used for the optical disk, the hard disk device, the memory card, and so on have been described in the above embodiments, the present invention is not limited thereto and is widely applicable to cases in which a FAT file system is used for other storage media.

The FAT file system in the above-described embodiments may be FAT16 or FAT32, but the present invention is not limited thereto and another FAT file system may also be used. Also, the present invention is widely applicable to cases in which file management systems other than a FAT file system are used.

Although cases in which the present invention is applied to a digital camera and a computer are described in the above embodiments, the present invention is not limited thereto and is widely applicable to various other recording apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a type detecting section configured to detect a type of detachably held storage medium;
an erase-block size detecting section configured to detect an erase-block size of the storage medium;
a recording section configured to record desired data to a data area in the storage medium and to record management information of the data area to a management area in the storage medium; and
a control section configured to control the recording section by issuing a command to the recording section, on the basis of a result of the detection performed by the type detecting section and of a result of the detection performed by the erase-block size detecting section,
wherein, each time a certain amount of data is recorded to the data area, the control section updates the management information in accordance with the recording of the certain amount of data to the data area, and
when the storage medium is detected by the type detecting section as being a storage medium for which a write size determination includes consideration of the erase-block size, the control section determines the write size for the certain amount of data according to the erase-block size such that an increased erase-block size corresponds to an increased write size.

2. The recording apparatus according to claim 1, wherein the certain amount of data corresponds to an integer multiple of the erase-block size.

3. The recording apparatus according to claim 1, further comprising:
a transfer-speed detecting section configured to detect a data transfer speed for the storage medium;
wherein the control section manages the certain amount of data by using a size of batch writing for performing recording to the storage medium by a single write command issued to the recording section and a count value for setting a period of time for updating the management information, the count value corresponding to the number of issuances of the write command, and
the control section sets the size of the batch writing on the basis of a value corresponding to a batch writing size determined from the erase-block size and a value corresponding to a batch writing size determined from the data transfer speed.

4. The recording apparatus according to claim 3, wherein the size of the batch writing is equal to an amount of data corresponding to an integer multiple of the erase-block size.

5. A recording method comprising the steps of:
detecting a type of detachably held storage medium;
detecting an erase-block size of the storage medium;
recording desired data to a data area in the storage medium and recording management information of the data area to a management area in the storage medium; and
controlling the recording step by issuing a command on the basis of a result of the detection performed in the type detecting step and of a result of the detection performed in the erase-block size detecting step,
wherein, in the controlling step, each time a certain amount of data is recorded to the data area, the management information is updated in accordance with the recording of the certain amount of data to the data area, and
when the storage medium is detected by the detecting a type step as being a storage medium for which a write size determination includes consideration of the erase-block size, the write size for the certain amount of data is determined according to the erase-block size such that an increased erase-block size corresponds to an increased write size.

6. A non-transitory computer readable storage medium having stored thereon a program that when executed by a computer causes the computer to execute a recording method for recording desired data to a detachably held storage medium, the program comprising the steps of:
detecting a type of the storage medium;
detecting an erase-block size of the storage medium;
recording desired data to a data area in the storage medium and recording management information of the data area to a management area in the storage medium; and
controlling the recording step by issuing a command on the basis of a result of the detection performed in the type detecting step and of a result of the detection performed in the erase-block size detecting step,
wherein, in the controlling step, each time a certain amount of data is recorded to the data area, the management information is updated in accordance with the recording of the certain amount of data to the data area, and
when the storage medium is detected by the detecting a type step as being a storage medium for which a write size determination includes consideration of the erase-block size, the write size for the certain amount of data is determined according to the erase-block size such that an increased erase-block size corresponds to an increased write size.

7. A recording apparatus comprising:
means for detecting a type of detachably held storage medium;
means for detecting an erase-block size of the storage medium;
a recording section configured to record desired data to a data area in the storage medium and to record management information of the data area to a management area in the storage medium; and
means for controlling the recording section by issuing a command to the recording section, on the basis of a result of the detection performed by means for detecting the type, and of a result of the detection performed by the means for detecting the erase-block size,
wherein, each time a certain amount of data is recorded to the data area, the means for controlling updates the management information in accordance with the recording of the certain amount of data to the data area, and
when the storage medium is detected by the means for detecting the type as being a storage medium for which a write size determination includes consideration of the erase-block size, the means for controlling determines the write size for the certain amount of data according to the erase-block size such that an increased erase-block size corresponds to an increased write size.

* * * * *